United States Patent [19]

Nagatani

[11] Patent Number: 5,894,364
[45] Date of Patent: Apr. 13, 1999

[54] STEREOSCOPIC IMAGE DISPLAY APPARATUS

[75] Inventor: Shinpei Nagatani, Kawasaki, Japan

[73] Assignee: Fujitsu Limited, Kawasaki, Japan

[21] Appl. No.: 08/825,115

[22] Filed: Mar. 27, 1997

[30] Foreign Application Priority Data

Jul. 15, 1996 [JP] Japan ................... 8-185109

[51] Int. Cl.$^6$ .............. G02B 27/24; G02B 6/04; G02F 1/1335
[52] U.S. Cl. .............. 359/472; 359/475; 385/120; 348/52; 349/15; 349/159
[58] Field of Search .............. 359/472, 471, 359/475, 477, 462; 385/115, 120, 121; 348/52; 349/62, 67, 15, 159

[56] References Cited

U.S. PATENT DOCUMENTS

| | | | |
|---|---|---|---|
| 4,173,391 | 11/1979 | Schure et al. | 385/120 |
| 4,569,571 | 2/1986 | Reidinger | 385/120 |
| 4,807,965 | 2/1989 | Garakani | 359/466 |
| 5,105,183 | 4/1992 | Beckman | 345/1 |
| 5,465,175 | 11/1995 | Woodgate et al. | 359/464 |
| 5,475,419 | 12/1995 | Carbery | 359/464 |
| 5,506,703 | 4/1996 | Suzuki et al. | 359/17 |

*Primary Examiner*—Jon Henry
*Attorney, Agent, or Firm*—Greer, Burns & Crain, Ltd.

[57] ABSTRACT

A stereoscopic image display apparatus includes an image display apparatus main body and a multi-angle image information generating unit for generating image information for a plurality of viewing angles from which a three-dimensional object is viewed. The image display apparatus main body includes a liquid crystal panel for displaying an angle-specific image derived from the angle-specific image information supplied from the multi-angle image information generating unit, and an angle-specific image radial distribution unit which, provided at the front of the liquid crystal panel, radially distributes the angle-specific image by providing directivity to a light beam carrying the angle-specific image displayed on the liquid crystal panel and thus directing the angle-specific image to a corresponding angle. When a viewer changes a view position or viewing angle, the viewer can experience one stereoscopic image turning into another. Thus, different aspects of the three-dimensional object are disclosed so that an extremely realistic stereoscopic vision that gives an impression that the three-dimensional object is actually behind the stereoscopic image display apparatus is provided.

29 Claims, 20 Drawing Sheets

FIG. 3A
FIG. 3B
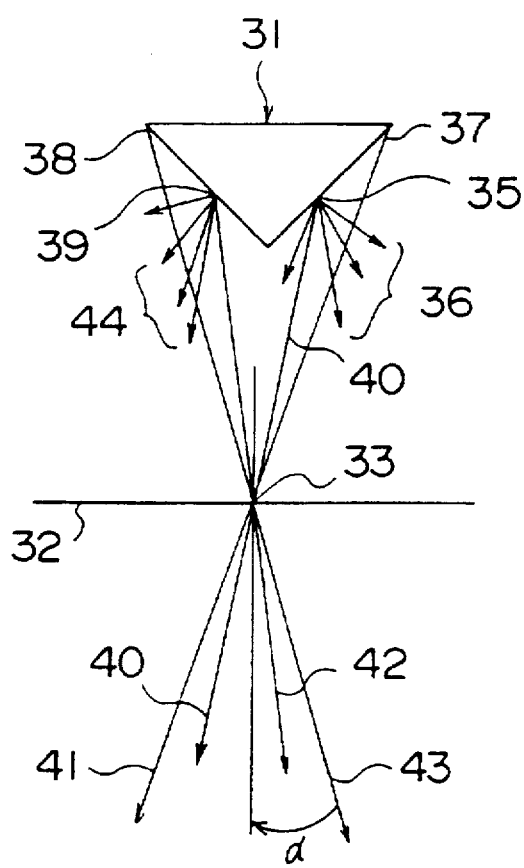
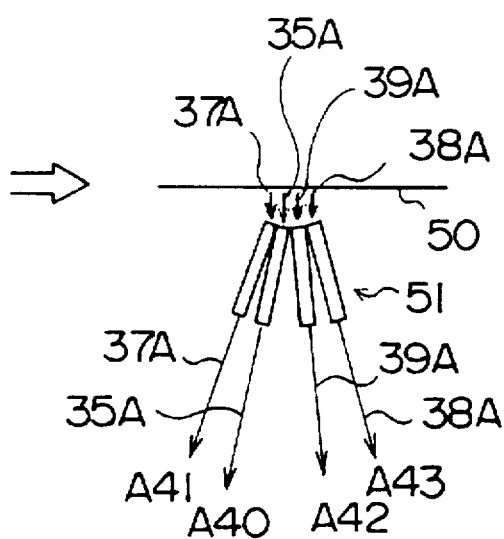
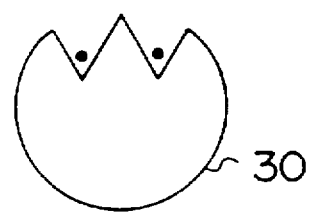

5,894,364

1

STEREOSCOPIC IMAGE DISPLAY APPARATUS

BACKGROUND OF THE INVENTION

1. Field of the Invention

The present invention generally relates to stereoscopic image display apparatuses and, more particularly, to a stereoscopic image display apparatus suitable for computer graphics technology.

With the recent development in computer graphics technology, it is required that a display apparatus is capable of displaying high-quality stereoscopic images.

2. Description of the Related Art

FIG. 1 shows a stereoscopic image display apparatus 10 according to the related art. In order to view a stereoscopic image, a viewer wears special glasses 11. The special glasses 11 have a right-eye liquid crystal shutter 12, a left-eye liquid crystal shutter 13 and a liquid crystal shutter driving unit 14. In cooperation with a two-dimensional image display unit 15 displaying right-eye image information 16 and left-eye image information 17 alternately, the right-eye liquid crystal shutter 12 and the left-eye liquid crystal shutter 13 of the special glasses 11 open alternately so that the viewer is able to view a stereoscopic image on the two-dimensional display unit 15.

FIGS. 2A and 2B show another stereoscopic image display apparatus 20 according to the related art. The stereoscopic image display apparatus 20 uses an image display unit 21 constructed such that a lenticular lens 23 formed of an array of longitudinally elongated cylindrical lenses is disposed on a display surface 22. The display surface 22 displays an image 26 comprising longitudinal stripes of a right-eye image 24 and a left-eye image 25. As shown in FIG. 2B, a light beam carrying the image 26 is refracted by the lenticular lens 23 so that the right-eye image 24 enters a right eye 27 of a viewer viewing the image display unit 21 and the left-eye image 25 enters a left eye 28 of the viewer viewing the image display unit 21. In this way, the viewer is able to view a stereoscopic image.

The conventional stereoscopic image display apparatus 10 and the stereoscopic image display apparatus 20 have a drawback in that viewers viewing at different positions relative to the two-dimensional image display unit 15 or the image display unit 21 can only view the same stereoscopic image. A viewer moving in front of the two-dimensional image display unit 15 or the image display unit 21 can not recognize a variation in the stereoscopic image viewed. Accordingly, display of a realistic stereoscopic image that gives an impression that an actual three-dimensional object is present behind the screen of the two-dimensional image display unit 15 or the image display unit 21 is impossible.

SUMMARY OF THE INVENTION

Accordingly, an object of the present invention is to provide a stereoscopic image display apparatus in which the aforementioned problem is eliminated.

Another and more specific object of the present invention is to provide a realistic stereoscopic vision in which different aspects of an object are smoothly disclosed depending on a position and a viewing angle of a viewer and an impression that an object is present behind an image display apparatus is delivered to the viewer.

The aforementioned objects can be achieved by a stereoscopic image display apparatus comprising: multi-angle image information generating means for generating angle-specific image information for a plurality of viewing angles from which an object is viewed; image display means for displaying an angle-specific image derived from the angle-specific image information supplied by the multi-angle image information generating means; angle-specific image radial distribution means which, provided at the front of the image display means, radially distributes an angle-specific image by providing directivity to a light beam carrying the angle-specific image displayed on the image display means and thus directs the angle-specific image to a corresponding angle.

BRIEF DESCRIPTION OF THE DRAWINGS

Other objects and further features of the present invention will be apparent from the following detailed description when read in conjunction with the accompanying drawings, in which:

FIGS. 3A and 3B are illustrations of the principle of the present invention;

DESCRIPTION OF THE PREFERRED EMBODIMENTS

Figure 1:
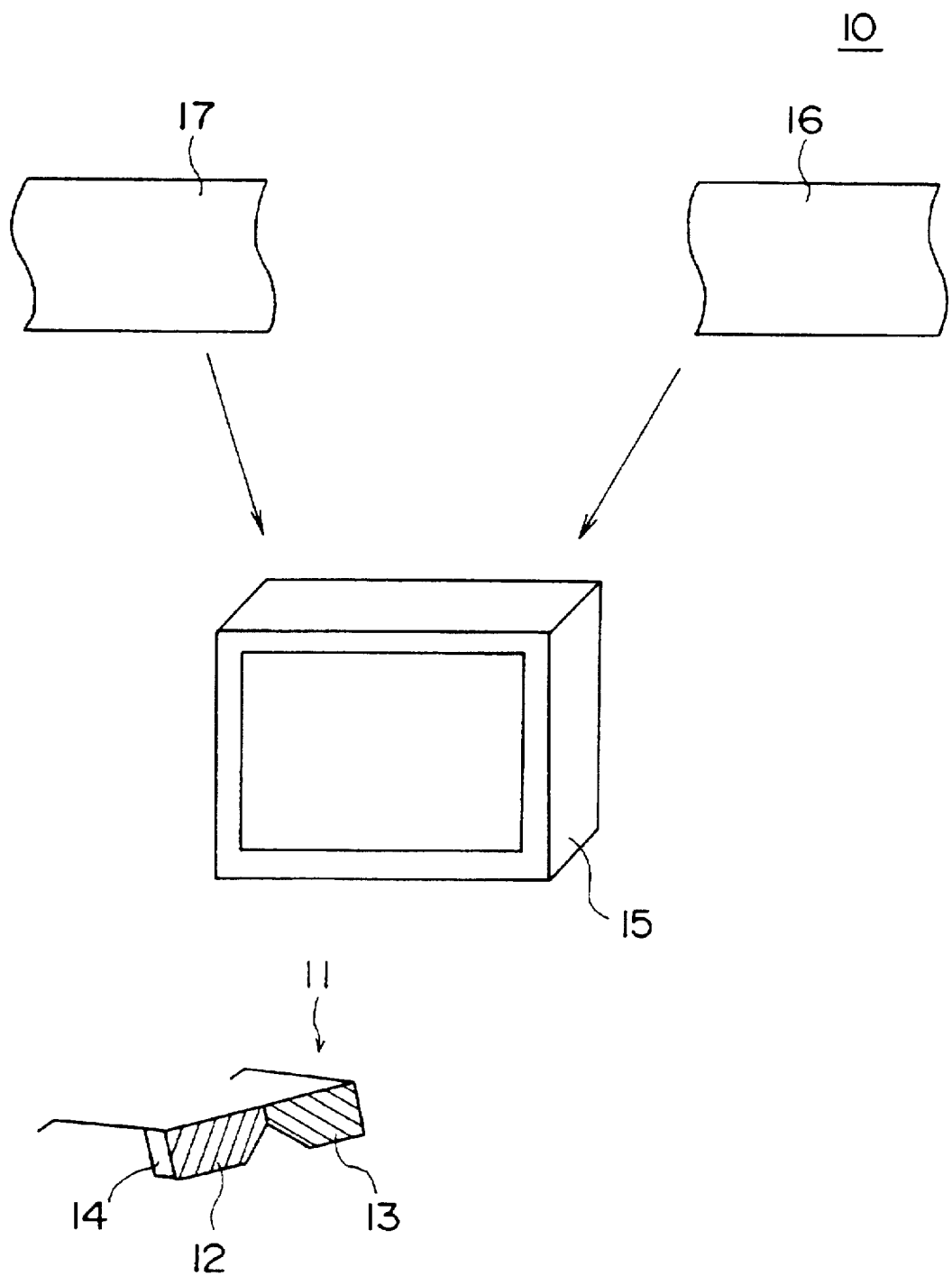
FIG. 1 shows an image display apparatus according to the related art.
Figure 2A:
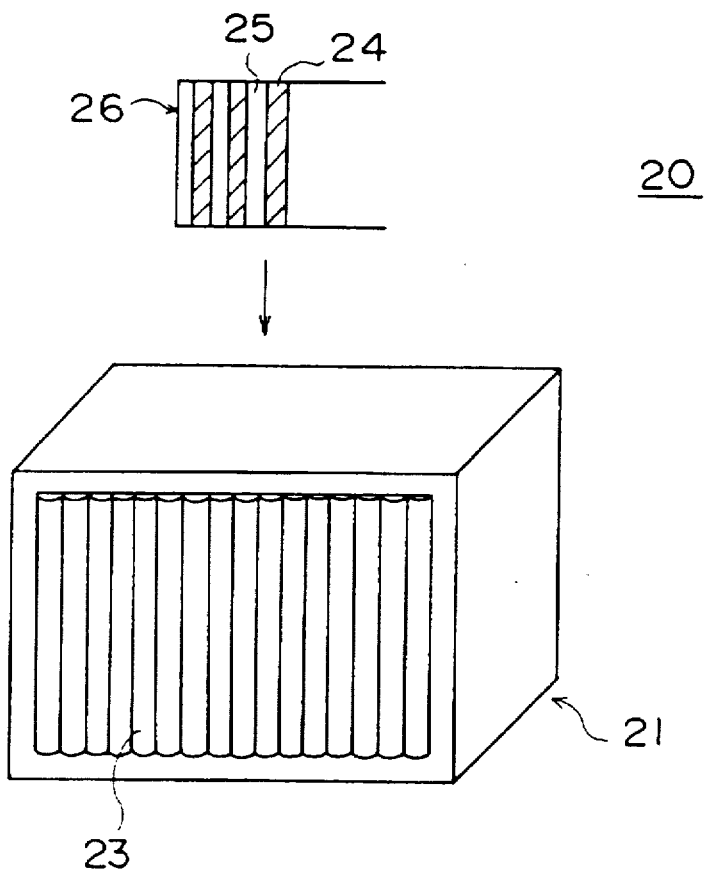
FIGS. 2A and 2B show another image display apparatus according to the related art.
Figure 2B:
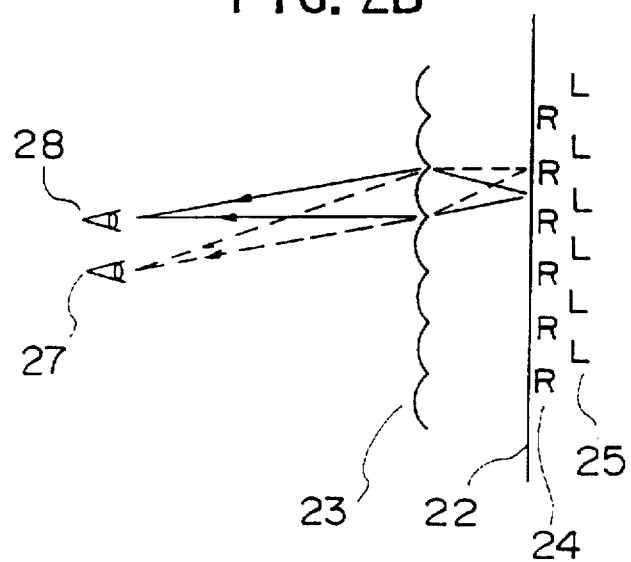

A description will be given of the principle of the present invention.

FIGS. 3A and 3B illustrate the principle of the present invention. As shown in FIG. 3A, it is assumed that a hypothetical window 32 is located between a viewer 30 and an object 31. A light beam 34 exiting the object 31 and passing through a point 33 on the hypothetical window 32 will be examined. A group of light beams 36 are radiated in respective directions from a point 35 on the object 31. Likewise, light beams are radiated in respective directions from points 37, 38 and 39 on the object 31. Only a light beam 40 of the group of light beams 36 exiting the point 35 passes through the point 33. Only a light beam 41 exits a point 37 on the object 31 and passes through the point 33. Only a light beam 42 exits a point 38 on the object 31 and passes through the point 33. Only a light beam 43 of a group of light beams 44 exiting the point 39 passes through the point 33.

The light beams 40, 41, 42 and 43 travel in different directions. Accordingly, given the point (viewing point) 33 on the hypothetical window 32 and the viewing direction (indicated by an angle α), only one set of light beams, of all the light beams radiated by all the different points on the object 31 in all the different directions, enter the eyes of the viewer 30. A background for this will be explained. Assume that a pinhole is provided on a wall. A viewer can view only one point on the object located behind the wall if the viewer sees through the pinhole at a distance from the wall.

The present invention is based on the fact that "if a viewing point on a hypothetical window and a viewing direction (angle α) are specified, only one set of light beams, of all the light beams radiated by all the different points on the object, enter the eyes of a viewer". As shown in FIG. 3B, radiating means 51 for radial distribution of different images in different directions is provided on a portion of the two-dimensional image display surface 50. The radiating means 51 is designed to supply an image 35A of the point 35 in the A40 direction that corresponds to the direction of the light beam 40, an image 37A of the point 37 in the A41 direction that corresponds to the direction of the light beam 41, an image 38A of the point 38 in the A42 direction that corresponds to the direction of the light beam 42, and an image 39A of the point 39 in the A43 direction that corresponds to the direction of the light beam 43.

Figure 4:
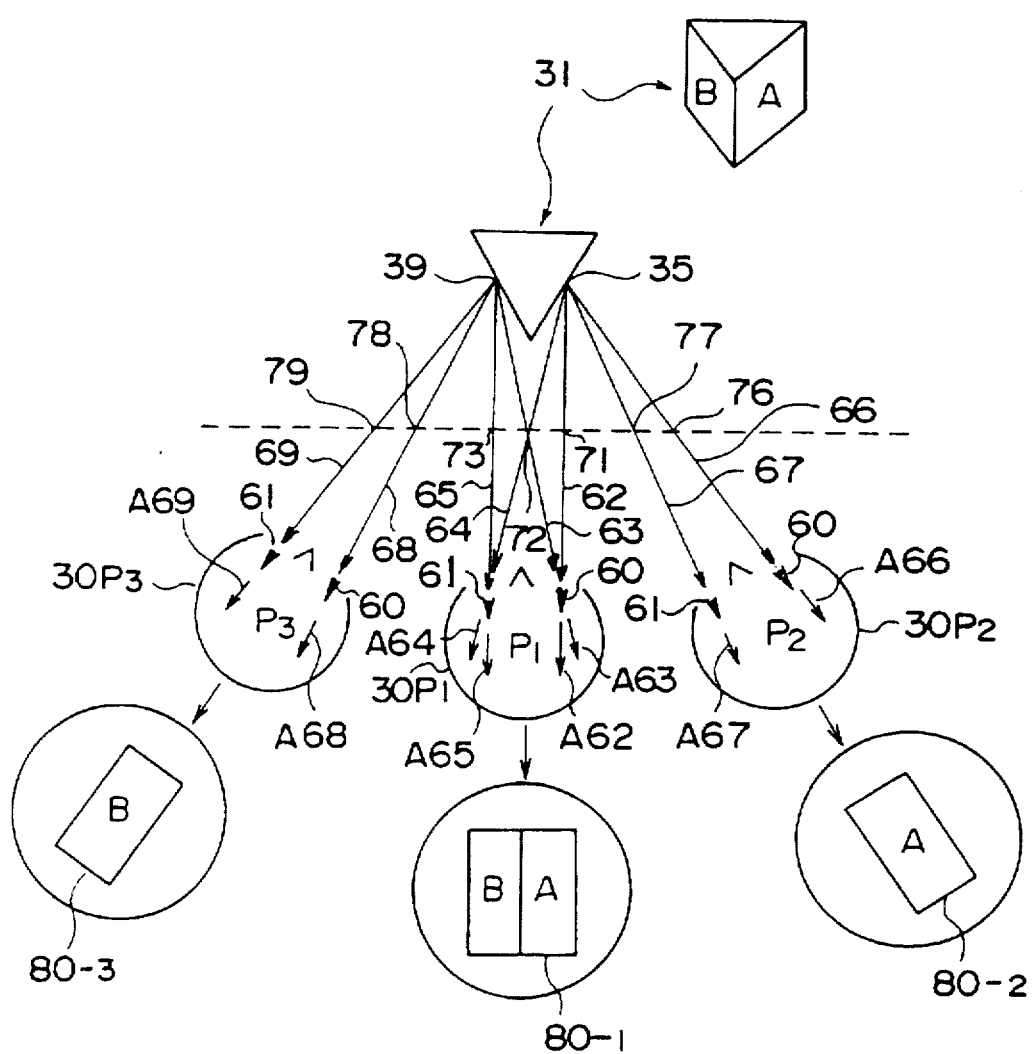
FIG. 4 is an illustration of the specific principle of the present invention.

FIG. 4 illustrates the principle of the present invention more specifically. A hypothetical window 32 is assumed between the viewer and object 31 having a shape of a triangular prism. It is assumed that there are three viewers: a viewer 30P1 at a position P1 facing the front of the object 31, a viewer 30P2 at a position P2 to the right of the viewer 30P1, and a viewer 30P3 at a position P3 to the left of the viewer 30P1. It is further assumed that the viewers 30P1, 30P2 and 30P3 are viewing the points 35 and 39 on the object 31.

Referring to FIG. 4, a light beam 62, of the group of light beams 36 emanating from the point 35 on the object 31, traveling in the A62 direction enters a right eye 60 of the viewer 30P1 after passing through a position 71 on the window 32. Also, a light beam 63, of the group of light beams 44 emanating from the point 39 on the object 31, traveling in the A63 direction enters the right eye 60 after passing through a position 72 on the window 32. A light beam 64, of the group of light beams 36, traveling in the A64 direction enters a left eye 61 of the viewer 30P1 after passing through the position 72 on the window 32. Also, a light beam 65, of the group of light beams 44, traveling in the A65 direction enters the left eye 61 after passing through a position 73. Thus, the viewer 30P1 is able to observe a stereoscopic image 80-1.

A light beam 66, of the group of light beams 36 emanating from the point 35 on the object 31, traveling in the A66 direction enters the right eye 60 of the viewer 30P2 after passing through a position 76 on the window 32. A light beam 67, of the group of light beams 36, traveling in the A67 direction enters the left eye 61 of the viewer 30P2 after passing through a position 77 on the window 32. Thus, the viewer 30P2 is able to observe a stereoscopic image 80-2.

A light beam 68, of the group of light beams 44 emanating from the point 39 on the object 31, traveling in the A68 direction enters the right eye 60 of the viewer 30P3 after passing through a position 78 on the window 32. A light beam 69, of the group of light beams 44, traveling in the A69 direction enters the left eye 61 of the viewer 30P3 after passing through a position 79 on the window 32. Thus, the viewer 30P3 is able to observe a stereoscopic image 80-3.

Figure 5:
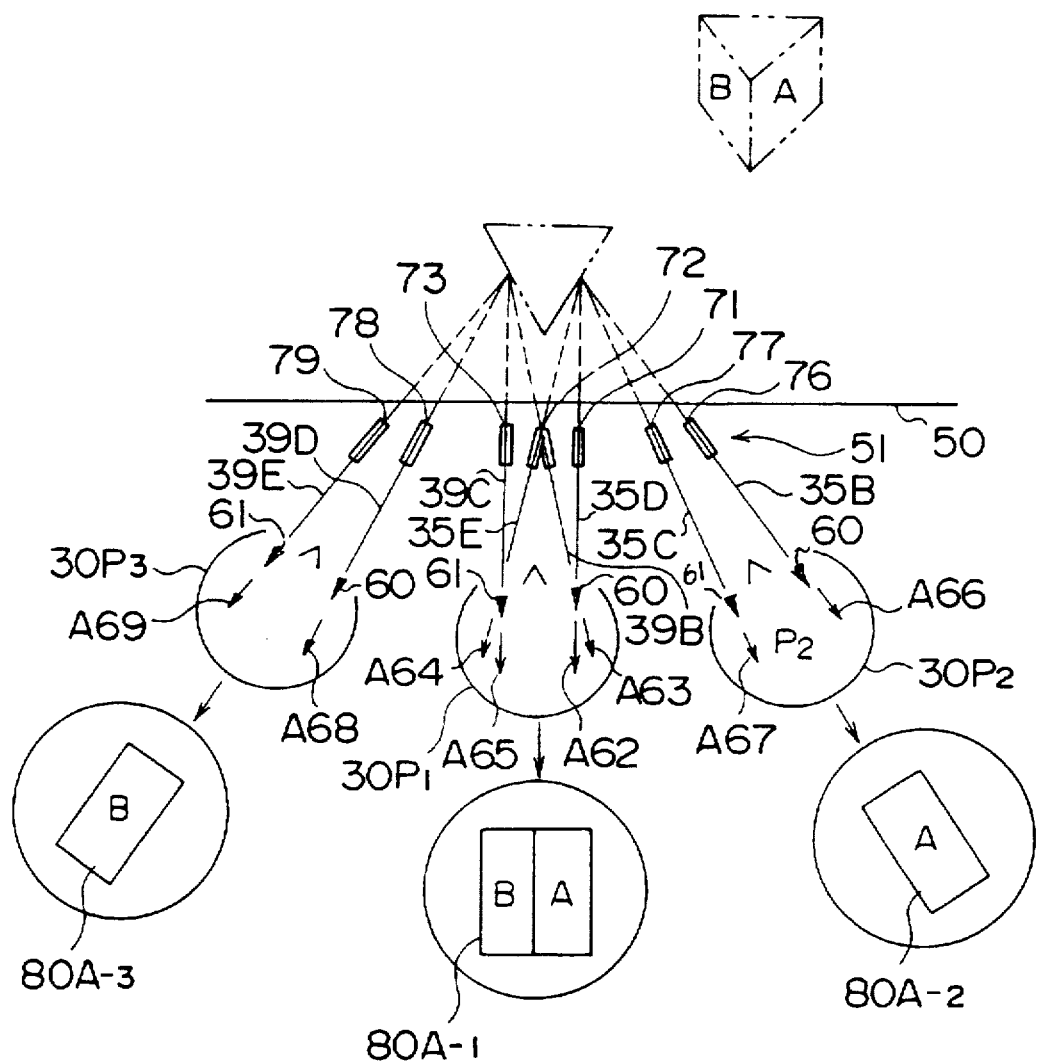
FIG. 5 is another illustration of the specific principle of the present invention.

As shown in FIG. 5, the radiating means 51 for distributing different images in different directions are provided in a plurality of locations on the two-dimensional image display surface 50. More specifically, the radiating means 51 is provided in the positions 76, 77, 71, 72, 73, 78 and 79 on the two-dimensional image display surface 50. The radiating means 51 at the position 76 supplies, in the A66 direction, an image 35B of the point 35 on the object 31 observed in a direction opposite to the A66 direction. The radiating means 51 at the position 77 supplies, in the A67 direction, an image 35C of the point 35 on the object 31 observed in a direction opposite to the A67 direction. The radiating means 51 at the position 71 supplies, in the A62 direction, an image 35D of the point 35 on the object 31 observed in a direction opposite to the A62 direction. The radiating means 51 at the position 72 supplies, in the A64 direction, an image 35E of the point 35 observed in a direction opposite to the A64 direction and also supplies, in the A63 direction, an image 39B of the point 39 observed in a direction opposite to the A63 direction. The radiating means 51 at the position 73 supplies, in the A65 direction, an image 39C of the point 39 on the object 31 observed in a direction opposite to the A65 direction. The radiating means 51 at the position 78 supplies, in the A68 direction, an image 39D of the point 39 on the object 31 observed in a direction opposite to the direction to the A68 direction. The radiating means 51 at the location 69 supplies, in the A69 direction, an image 39E of the point 39 on the object 31 observed in a direction opposite to the A69 direction.

The images 35D and 39B enter the right eye 60 of the viewer 30P1 located at the position P1 with respect to the two-dimensional image display surface 50; and the images 35E and 39C enter the left eye 61 of the viewer 30P1. Accordingly, the viewer 30P1 recognizes a stereoscopic image 80A-1 substantially identical to the stereoscopic image 80-1 recognized when the front of the object 31 is viewed.

The image 35B enters the right eye 60 of the viewer 30P2 located at the position P2; and the image 35C enters the left eye 61 of the viewer 30P2. Accordingly, the viewer 30P2 recognizes a stereoscopic image 80A-2 substantially identical to the stereoscopic image 80A-2 recognized when the right side of the object 31 is observed.

The image 39D enters the right eye 60 of the viewer 30P3 located at the position P3; and the image 39E enters the left eye 61 of the viewer 30P3. Accordingly, the viewer 30P3 recognizes a stereoscopic image 80A-3 substantially identical to the stereoscopic image 80-3 recognized when the left side of the object 31 is observed.

Accordingly, the stereoscopic image display apparatus according to the present invention allows a viewer to recognize a stereoscopic image which provides an appearance that an actual object is located in front of the two-dimensional image display surface 50.

A description will now be given of embodiments based on the principle described above.

Figure 6:
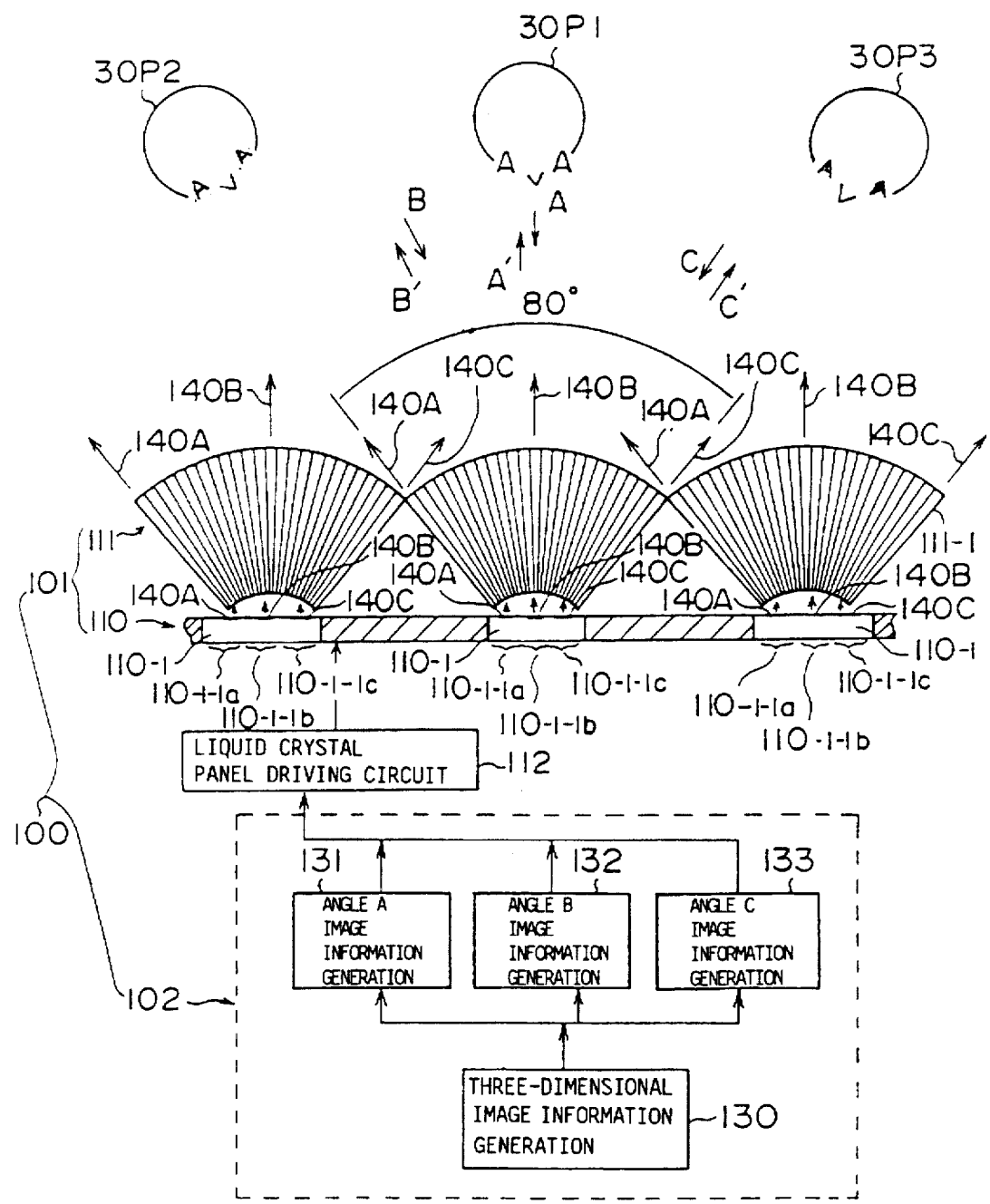
FIG. 6 shows a stereoscopic image display apparatus according to a first embodiment of the present invention.

FIG. 6 shows a stereoscopic image display apparatus 100 according to a first embodiment of the present invention. The stereoscopic image display apparatus 100 comprises an image display apparatus main body 101 which is generally flat and a multi-angle image information generating unit 102. The image display apparatus main body 101 and the multi-angle image information generating unit 102 operate in cooperation with each other. The image display apparatus main body 101 is constructed to display a stereoscopic image when supplied with multi-viewpoint image information by the multi-angle image information generating unit 102. The multi-angle image information generating unit 102 is constructed to generate multi-viewpoint image information which, when supplied to the image display apparatus main body 101, produces a display of the stereoscopic image in the image display apparatus main body 101.

First, a description will be given of the image display apparatus main body 101.

Figure 7:
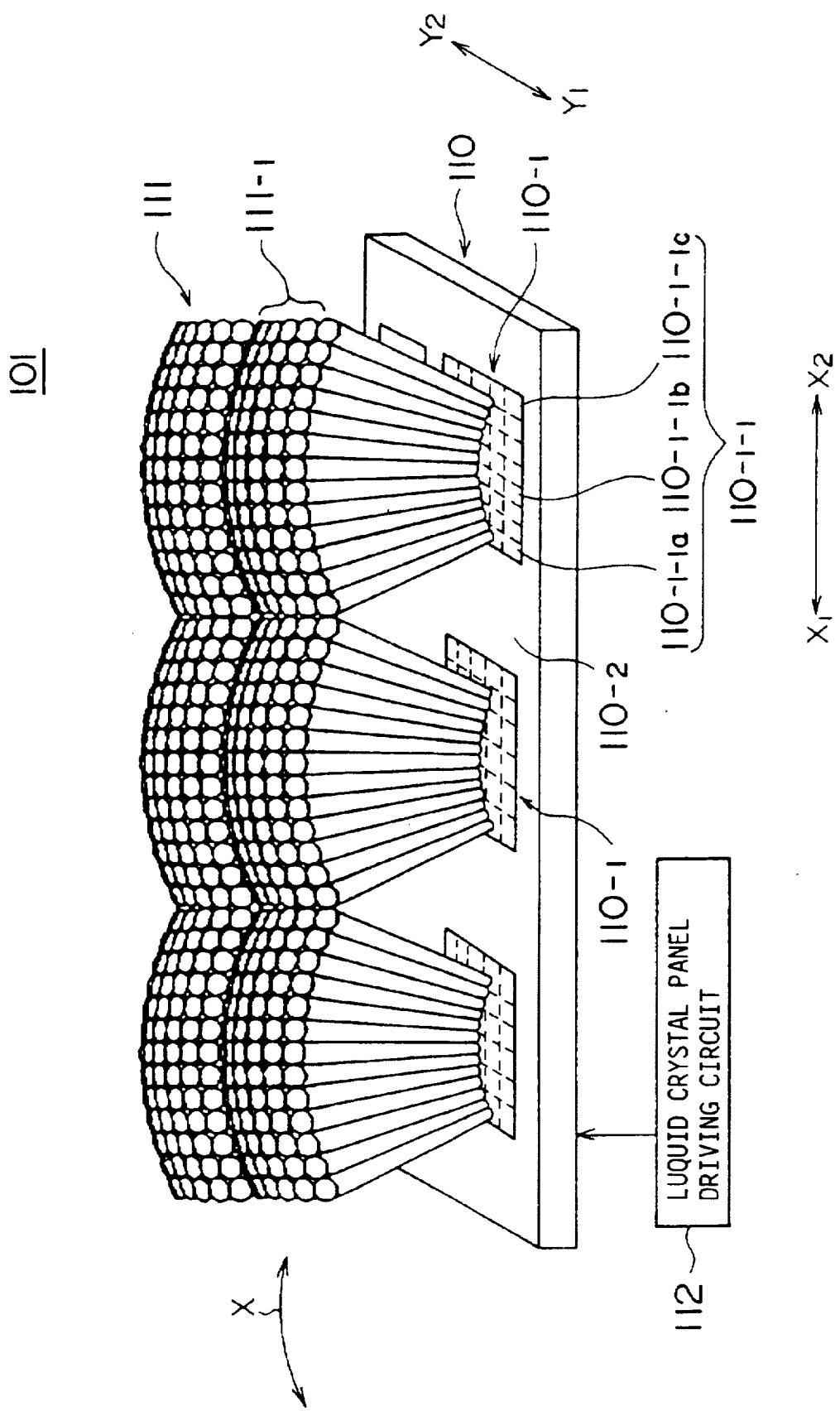
FIG. 7 is a perspective view of an image display apparatus main body of the stereoscopic image display apparatus of FIG. 6.

As is also shown in FIG. 7, the image display apparatus main body 101 comprises a liquid crystal panel 110, an angle-specific image radial distribution unit 111 and a liquid crystal panel driving circuit 112.

The liquid crystal panel 110 is a generally flat panel. The liquid crystal panel 110 includes a matrix comprising a plurality of rectangular angle-specific image groupwise display areas 110-1. Non-display areas 112 having a black surface and not involved in display are provided between adjacent angle-specific image groupwise display areas 110-1. Each of the angle-specific image groupwise display areas 110-1 includes a matrix comprising a plurality of angle-specific image display units 110-1-1. The liquid crystal panel constitutes image display means.

Assuming that the liquid crystal panel 110 is a window through which a viewer views an object, an angle-specific image display area 110-1-1a which is displaced in the X1 direction in the angle-specific image groupwise display area 110-1 is used to display an X1-displaced angle-specific image that corresponds to an image observed when the viewer views the object through a position in the liquid crystal panel 110 that is displaced in the X1 direction. Assuming also that the liquid crystal panel 110 is a window through which a viewer views an object, an angle-specific image display area 110-1-1b at the center is used to display a center angle-specific image that corresponds to an image observed when the viewer views the object through a point at the center of the liquid crystal panel 110. Assuming also that the liquid crystal panel 110 is a window through which a viewer views an object, an angle-specific image display area 110-1-1c which is displaced in the X2 direction in the angle-specific image groupwise display area 110-1 is used to display an X2-displaced angle-specific image that corresponds to an image observed when the viewer views the object through a point in the liquid crystal panel 110 that is displaced in the X2 direction.

The angle-specific image radial distribution unit 111 includes a matrix of a plurality of angle-specific image radial distribution parts 111-1. Each of the angle-specific image radial distribution parts 111-1 is located immediately in front of the corresponding angle-specific image groupwise display area 110-1 of the liquid crystal panel 110. The angle-specific image radial distribution unit 111 constitutes angle-specific image radial distribution means.

Figure 8:
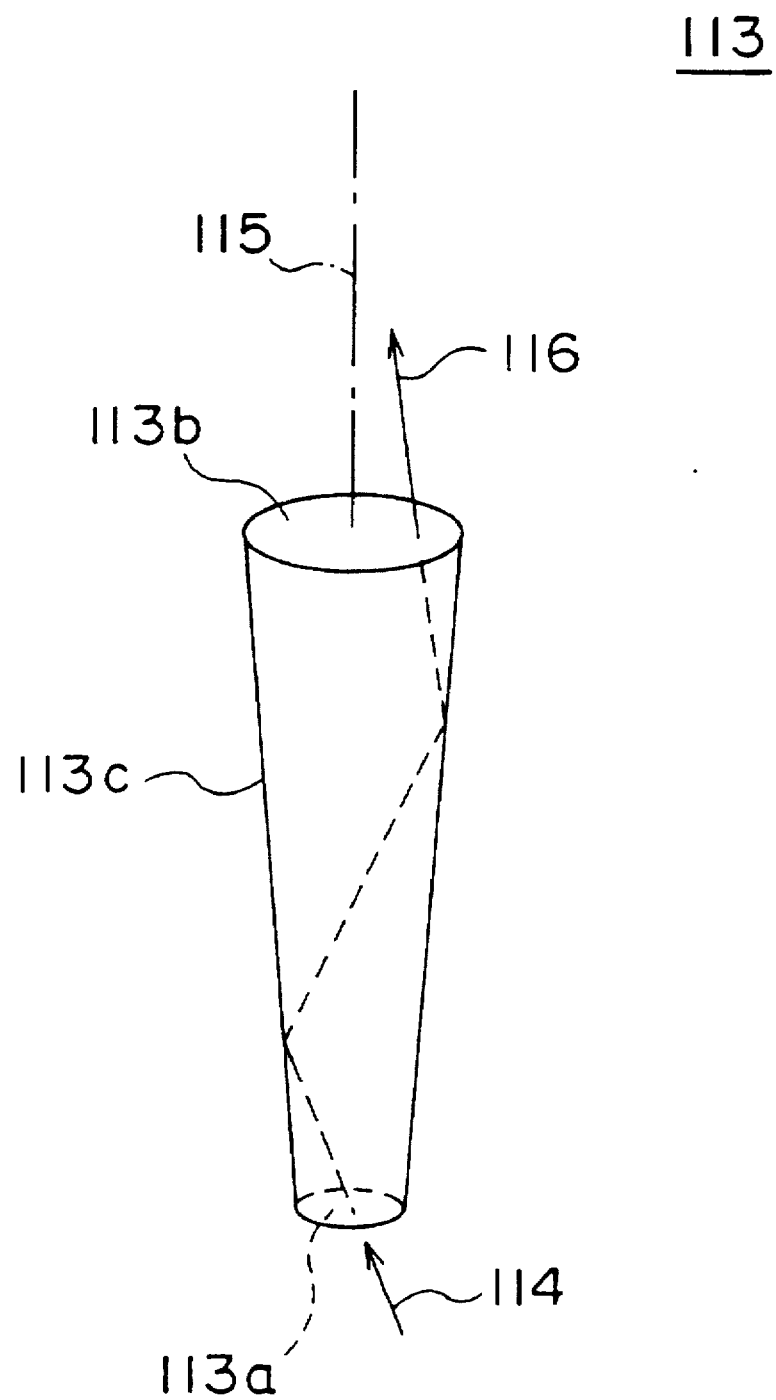
FIG. 8 is an enlarged view of a transparent column constituting an angle-specific image radial distribution unit.

Each of the angle-specific image radial distribution parts 111-1 is formed of a transparent column assembly comprising a plurality of transparent columns 113 shown in FIG. 8.

The transparent column 113 has a generally conical shape and has an entrance surface 113a, an exit surface 113b slightly wider than the entrance surface 113a and a peripheral surface 113c. The transparent column 113 causes a light beam 114 incident on the entry surface 113a to be reflected interiorly to the peripheral surface 113c so that a light beam 116 exits from the exit surface 113b in a direction closer to an axial line 115 of the transparent column 113. That is, the transparent column 113 functions to impart a directivity that shifts the light beam 116 incident on the entrance surface 113a toward the axial line 115 when exiting from the exit surface 113b. For example, the dimensions of the transparent column 113 are such that the diameter of the entrance surface 113a is 0.67 mm, the diameter of the exit surface 113b is 2.1 mm and the total length is 24.8 mm.

An array of a plurality of transparent columns 113 is formed such that the peripheral surfaces 113c thereof are in close contact with each other. As indicated by the arcuate arrow X in FIG. 7, the array of the plurality of transparent columns 113 is formed as a fan extending in the X1–X2 direction at an angle of 80 degrees. A matrix of the entrance surfaces 113a of the transparent columns 113 forms a circumferential surface 117. A matrix of the exit surfaces 113b of the transparent columns 113 forms a circumferential surface 118.

The circumferential surface 117 of the angle-specific image radial distribution part 111-1 faces the angle-specific image groupwise display area 110-1 such that the entrance surface 113a of the individual transparent column 113 is substantially opposite to the angle-specific image display unit 110-1-1.

A description will now be given of the operation of the image display apparatus main body 110 having the above-described construction.

Figure 9:
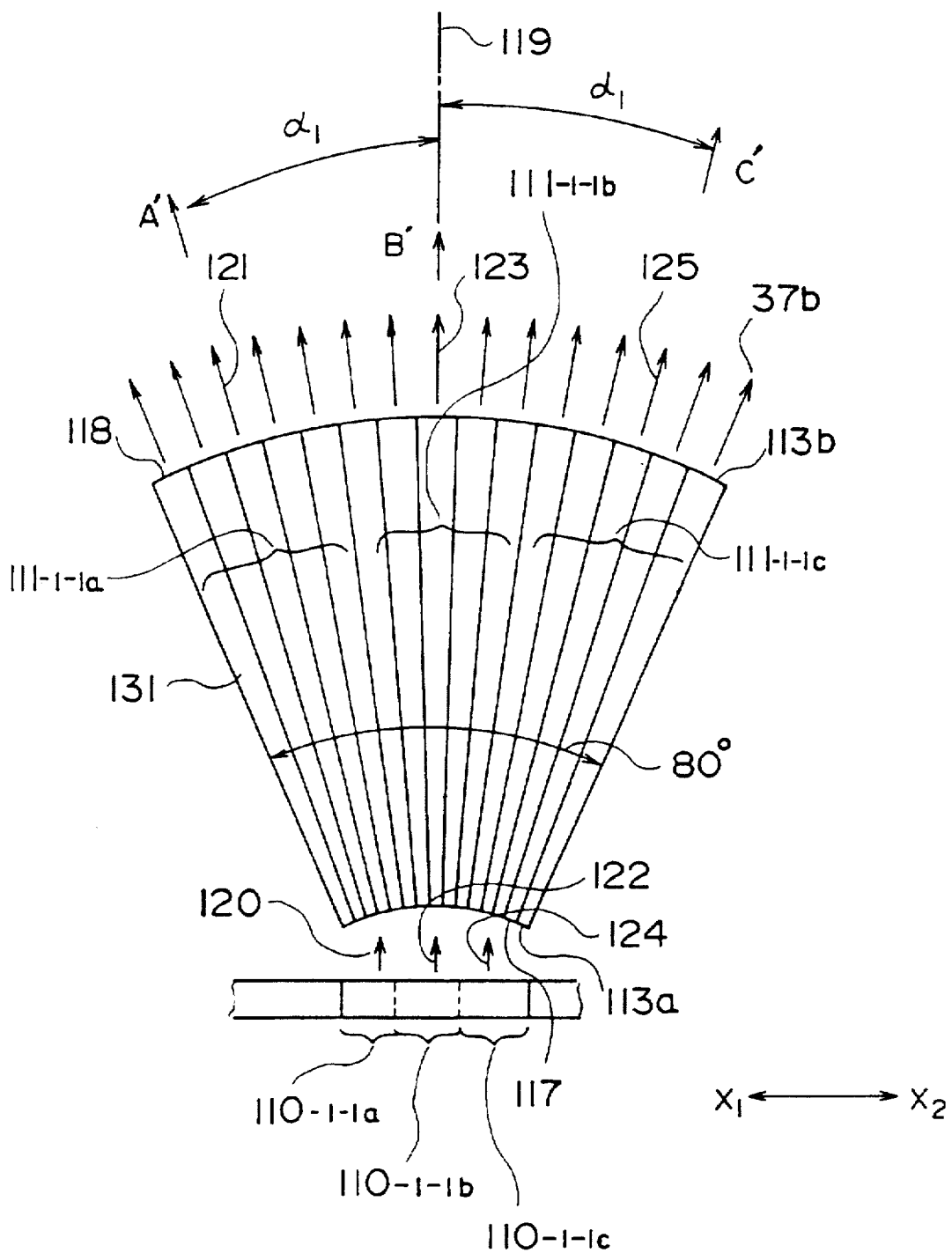
FIG. 9 illustrates the function of the image display apparatus main body.

As shown in FIG. 9, a light beam 120 for an angle-specific image displayed in the angle-specific image display area 110-1-1a displaced in the X1 direction in the angle-specific image groupwise display area 110-1 enters the transparent columns 113 forming a transparent column assembly 111-1-1a displaced in the X1 direction of the angle-specific image radial distribution part 111-1. While passing through the transparent column 113, the light beam 120 is directed in the X1 direction toward the axial line of the transparent column 113, that is, the directivity indicated by the A' direction forming an angle α1 with respect to a perpendicular 119 of the image display apparatus main body 101 is imparted to the light beam 120, thus producing an exiting light beam 121 traveling in the A' direction.

A light beam 122 for an angle-specific image displayed in the central angle-specific image display area 110-1-1b in the angle-specific image groupwise display area 110-1 enters the transparent columns 113 forming a central transparent column assembly 111-1-1b of the angle-specific image radial distribution part 111-1. While passing through the transparent column 113, the light beam 122 is directed toward the axial line of the transparent column 113, that is, the directivity indicated by the B' direction which coincides with the perpendicular 119 of the image display apparatus main body 101 is imparted to the light beam 122, thus producing an exiting light beam 123 traveling in the B' direction.

A light beam 124 for an angle-specific image displayed in the angle-specific image display area 110-1-1c displaced in the X2 direction in the angle-specific image groupwise display area 110-1 enters the transparent columns 113 forming a transparent column assembly 111-1-1c displaced in the X2 direction of the angle-specific image radial distribution part 111-1. While passing through the transparent column 113, the light beam 124 is directed in the X2 direction toward the axial line of the transparent column 113, that is, the directivity indicated by the directivity C' forming an angle α1 with respect to the perpendicular 119 of the image display apparatus main body 101 is imparted to the light beam 124, thus producing an exiting light beam 125 traveling in the C' direction.

As described above, the light beams 120, 122 and 124 exiting the angle-specific image display areas 110-1-1a, 110-1-1b and 110-1-1c, respectively, of the angle-specific image groupwise display area 110-1 in the direction perpendicular to the surface of the angle-specific image groupwise display area 110-1 radiate in the form of the light beams 121, 123 and 125. In other words, the angle-specific images displayed in the angle-specific image display areas 110-1-1a, 110-1-1b and 110-1-1c of the angle-specific image groupwise display area 110-1 are radially distributed.

A description will now be given of the multi-angle image information generating unit 102.

As shown in FIG. 6, the multi-angle image information generating unit 102 is implemented by a computer device having a three-dimensional image information generating unit 130, an angle A image information generating part 131, an angle B image information generating part 132 and an angle C image information generating part 133.

The three-dimensional image information generating unit 130 generates three-dimensional image information. The angle A image information generating unit 131 extracts and processes a portion of the three-dimensional image information generated by the three-dimensional image information generating unit 130 so as to generate two-dimensional image information providing an image viewed from an angle A (see FIG. 6). The angle B image information generating unit 132 extracts and processes a portion of the three-dimensional image information generated by the three-dimensional image information generating unit 130 so as to generate two-dimensional image information providing an image viewed from an angle B (see FIG. 6). The angle C image information generating unit 133 extracts and processes a portion of the three-dimensional image information generated by the three-dimensional image information generating unit 130 so as to generate two-dimensional image information providing an image viewed from an angle C (see FIG. 6). Thus, the multi-angle image information generating unit 102 generates two-dimensional image information for each of the viewing angles from which an object is viewed.

The angle A image information generating unit 131, the angle B image information generating unit 132 and the angle C image information generating unit 133 do not operate sequentially but simultaneously. That is, the three-dimensional image information generated by the three-dimensional image generating unit 130 is subject to parallel processing. Accordingly, a large volume of the three-dimensional image information generated by the three-dimensional image information generating unit 130 can be processed at a high speed, thus providing a stereoscopic image characterized by a smooth motion.

The output of the angle A image information generating unit 131, the angle B image information generating unit 132 and the angle C image information generating unit 133 is supplied to the liquid crystal panel driving circuit 112.

A description will now be given of the operation of the stereoscopic image display apparatus 100 having the above-described construction.

Referring to FIG. 6, the three-dimensional image information generating unit 130 generates the three-dimensional image information; the angle A image information generating unit 131 generates the angle A image information; the angle B image information generating unit 132 generates the angle B image information; and the angle C image information generating unit 133 generates the angle C image information.

The output of the angle A image information generating unit 131, the angle B image information generating unit 132 and the angle C image information generating unit 133 is supplied to the liquid crystal panel driving circuit 112 so that the liquid crystal panel 110 is operated so as to display images on the angle-specific image groupwise display area 110-1.

The images are displayed in the angle-specific image groupwise display area 110-1 in the following manner. The angle-specific image display area 110-1-1a is supplied with the angle A image information from the angle A image information generating unit 131 so as to display an angle A image 140A; the angle-specific image display area 110-1-1b is supplied with the angle B image information from the angle B image information generating unit 132 so as to display an angle B image 140B; and the angle-specific image display area 110-1-1c is supplied with the angle C image information from the angle C image information generating unit 133 so as to display an angle C image 140C.

The light beams carrying the angle A image 140A, the angle B image 140B and the angle C image 140C and perpendicularly exiting the surface of the angle-specific image groupwise display area 110-1 enter the respective angle-specific image radial distribution part 111-1 of the angle-specific image radial distribution unit 111 and exit therefrom after traveling therethrough. By traveling through the angle-specific image radial distribution part 111-1, the angle A image 140A, the angle B image 140B and the angle C image 140C are radially distributed so that the angle A image 140A is directed in the A' direction opposite to the A direction, the angle B image 140B is directed in the B' direction opposite to the B direction and the angle C image 140C is directed in the C' direction opposite to the C direction.

Accordingly, the angle A image 140A primarily enters the eyes of the viewer 30P1 at the position P1 facing the front of the image display apparatus main body 101 so that the viewer 30P1 experiences a stereoscopic vision substantially identical to the stereoscopic vision experienced when the object is viewed from the front.

The angle B image 140B primarily enters the eyes of the viewer 30P2 who is at the position P2 displaced in the X1 direction (to the right) with respect to the position P1 and faces the image display apparatus main body 101. Accordingly, the viewer 30P2 experiences a stereoscopic vision substantially identical to the stereoscopic vision experienced when the object is viewed from the right.

The angle C image 140C primarily enters the eyes of the viewer 30P3 who is at the position P3 displaced in the X2 direction (to the left) with respect to the position P1 and faces the image display apparatus main body 101. Accordingly, the viewer 30P3 experiences a stereoscopic vision substantially identical to the stereoscopic vision experienced when the object is viewed from the left.

Thus, a viewer viewing the image display apparatus main body 101 experiences one stereoscopic image turning into another, disclosing different aspects of a three-dimensional object, as the viewing position or the viewing angle changes. Thus, an extremely realistic stereoscopic vision that gives an impression that the object is actually behind the image display apparatus main body 101 is provided.

A description will now be given of variations of the image display apparatus main body 101 of the stereoscopic image display apparatus 100.

The liquid crystal panel 110 of the image display apparatus main body 101 may be a CRT device. Alternatively, an LED panel comprising an array of LED elements may be used.

Figure 10A:
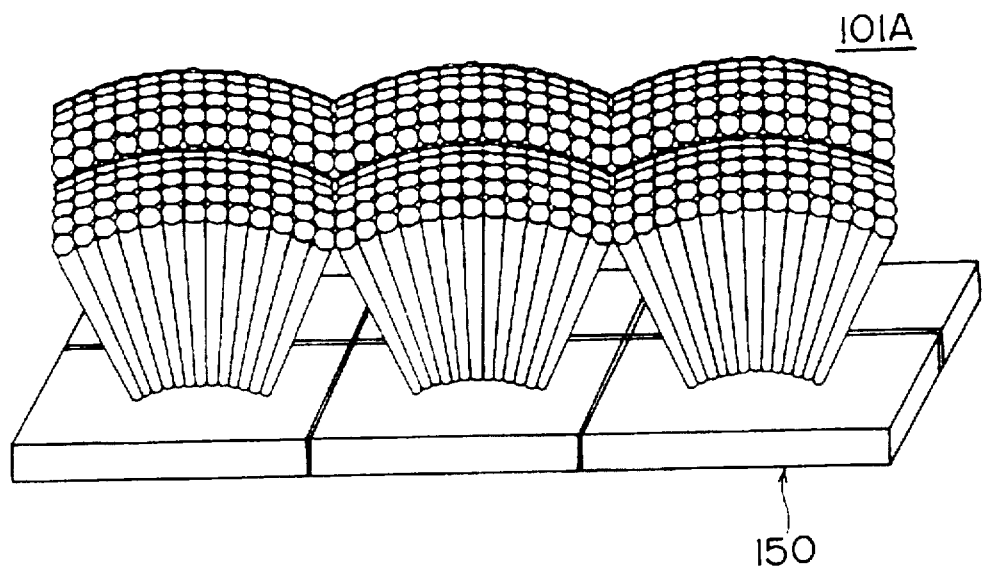
FIGS. 10A and 10B shows a first variation of the image display apparatus main body of FIG. 6.
Figure 10B:
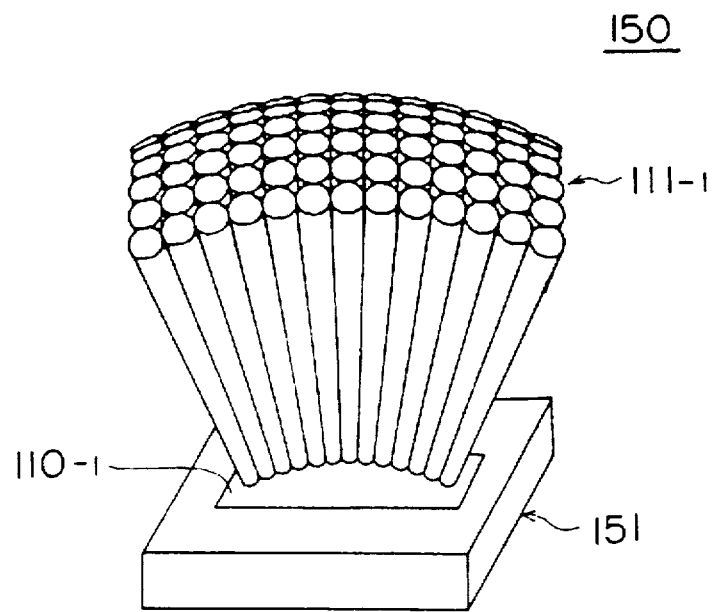

FIG. 10A shows an image display apparatus main body 101A according to a first variation. The image display apparatus main body 101A includes a matrix of image display blocks 150 shown in FIG. 10B. Each of the image display block 150 comprises a small liquid crystal panel 151 formed as a rectangle and having an angle-specific image groupwise display area 110-1, and an angle-specific image radial distribution part 111-1 fixed on the small liquid crystal panel 151.

An array of the small liquid crystal panels 151 constitutes image display means, and an array of the angle-specific image radial distribution parts 111-1 constitutes angle-specific image radial distribution means.

Since the image display apparatus main body 101A is constructed of a matrix of a plurality of image display blocks 150, fabrication and repair thereof is relatively easy.

Figure 11:
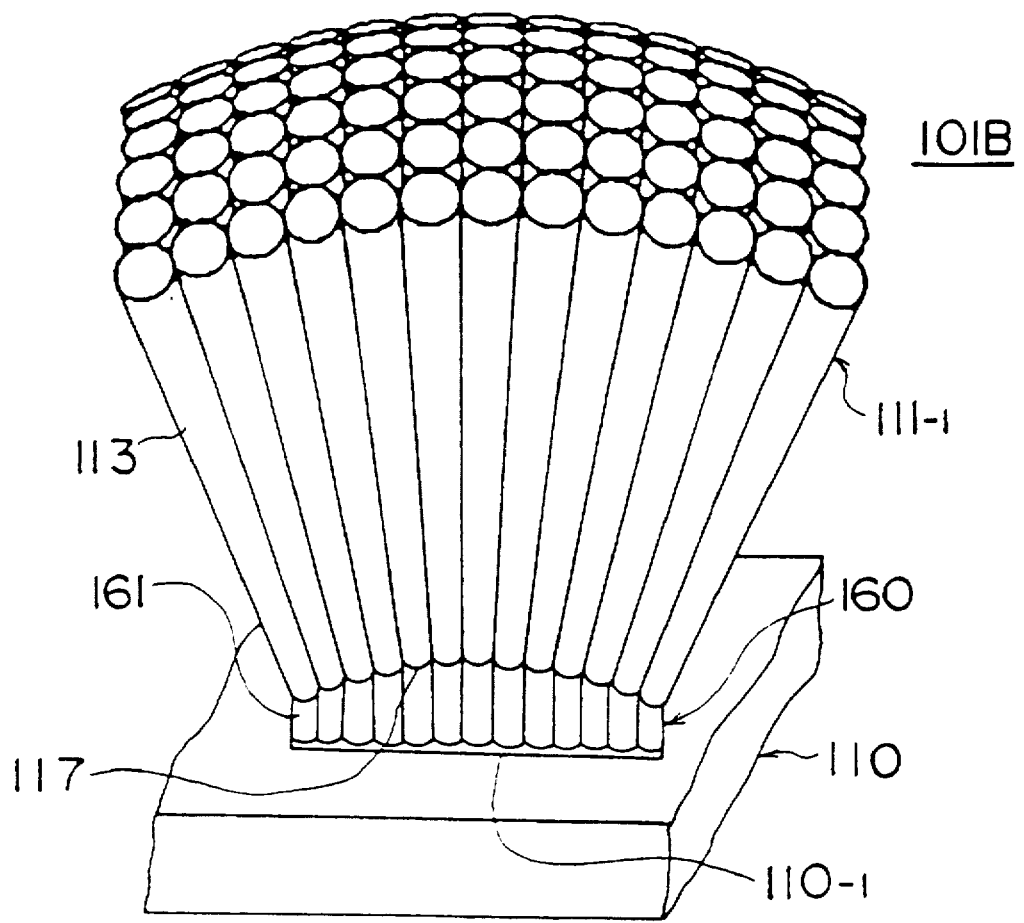
FIG. 11 shows a second variation of the image display apparatus main body of FIG. 6.

FIG. 11 shows an image display apparatus main body 101B according to a second variation. The image display apparatus main body 101B is constructed such that a plastic optical fiber group 160 is provided between the rectangular angle-specific image groupwise display area 110-1 of the liquid crystal panel 110 and the circumferential surface 117 of the angle-specific image radial distribution part 111-1. The plastic optical fiber group 160 is constructed such that each of a plurality of plastic optical fibers 161 is coupled to the entrance surface 113a of the transparent column 113. A lower end of each of the plastic optical fibers 161 faces the angle-specific image display unit 110-1-1 of the angle-specific image groupwise display area 110-1.

According to the image display apparatus main body 101B having the above-described construction, because the images displayed in the angle-specific image display unit 110-1-1 are propagated independently in the respective plastic optical fibers 161 before entering the transparent column 113, a crosstalk interference of the images in the adjacent angle-specific image display units 110-1-1 does not occur. Accordingly, a clear stereoscopic image can be displayed.

The plastic optical fiber group 160 constitutes angle-specific image individual input means, and an assembly of optical guide members. An alternative means of guiding beams may be provided in place of the plastic optical fiber group 160.

Figure 12:
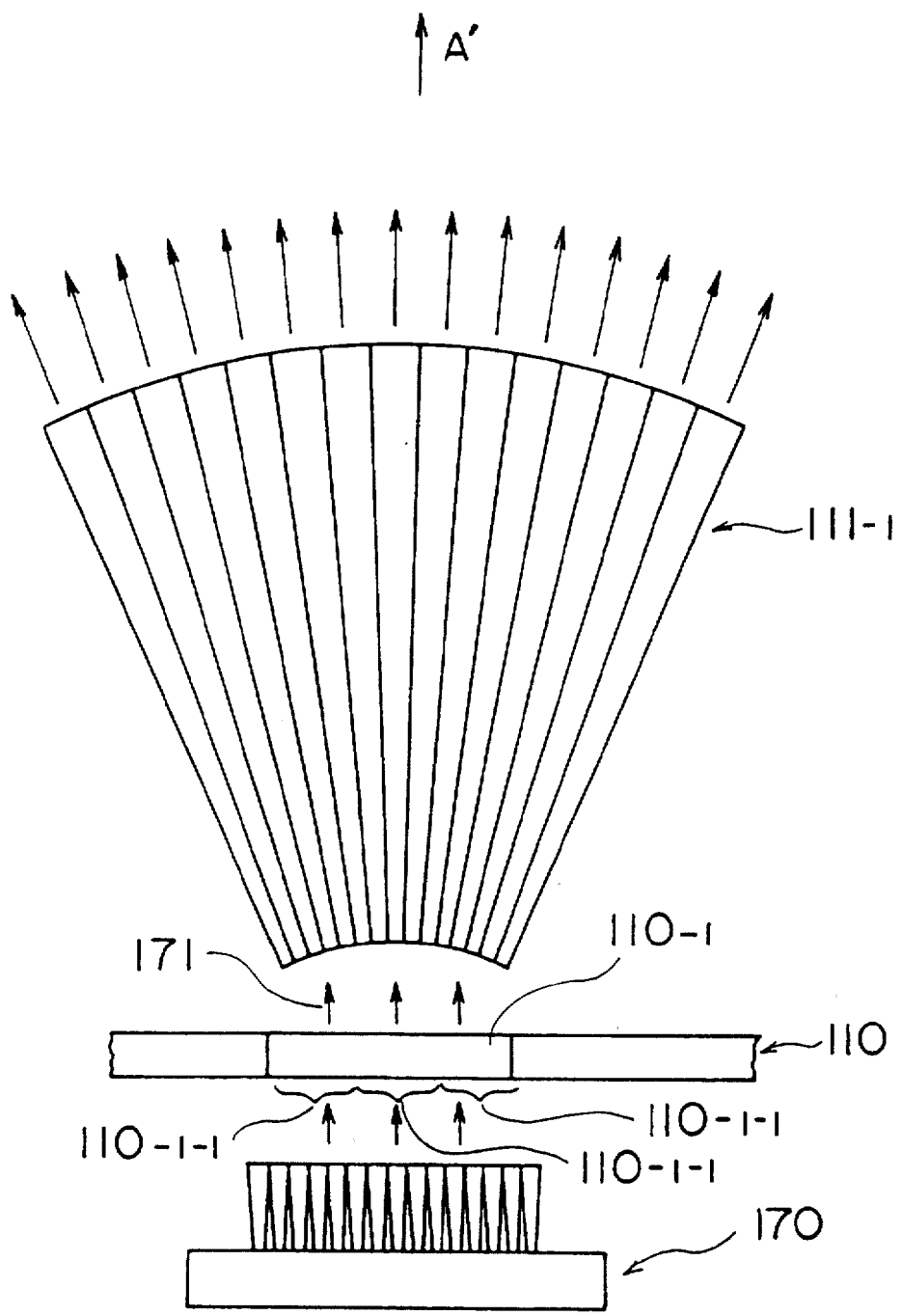
FIG. 12 shows a third variation of the image display apparatus main body of FIG. 6.

FIG. 12 shows an image display apparatus main body 101C according to a third variation. The image display apparatus main body 101C is constructed such that a directional light source 170 having a directivity in the A' direction is provided beneath the image display apparatus main body 101C as a backlight source (not shown in FIG. 6). As a result of providing the directional light source 170, the beams for images displayed in the angle-specific image display unit 110-1-1 of the angle-specific image groupwise display area 110-1 of the liquid crystal panel 110 travel in the A' direction as indicated by the numeral 171. The beams are propagated without being subject to an interference before reaching the angle-specific image radial distribution part 111-1. Japanese Laid-Open Patent Application No. 7-98416 discloses details of the directional light source 170. The directional light source 170 constitutes angle-specific image individual input means.

According to the image display apparatus main body 101C, a clear stereoscopic image is displayed because a crosstalk interference of the images in the adjacent angle-specific image display units 110-1-1 does not occur.

Figure 13:
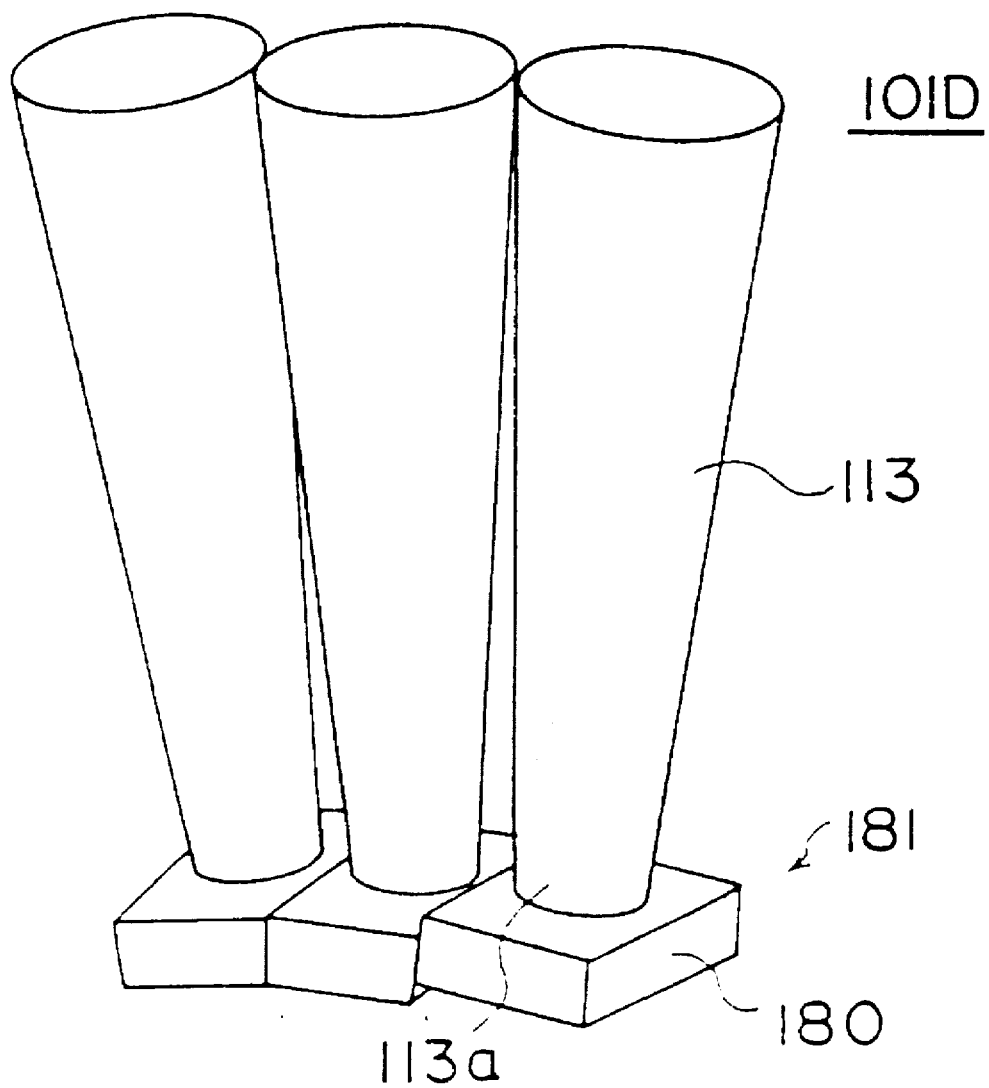
FIG. 13 shows a fourth variation of the image display apparatus main body of FIG. 6.

FIG. 13 is an enlarged fragmentary view of an image display apparatus main body 101D according to a fourth variation. The image display apparatus main body 101D is constructed such that transparent column and LED (light emitting diode) assemblies 181 formed by adhesively attaching an LED element 180 to the entrance surface 113a of each of the transparent columns 113 are radially arranged.

Since the image display apparatus main body 101D is constructed such that the transparent column and LED assemblies 181 are arranged, fabrication thereof is relatively easy.

The arranged LED elements embody image display means, and the arranged transparent columns 113 embody angle-specific image radial distribution means.

The LED elements in the image display apparatus main body 101D may be replaced by VFD (vacuum fluorescent display) elements or EL (electroluminescence) elements.

Figure 14:
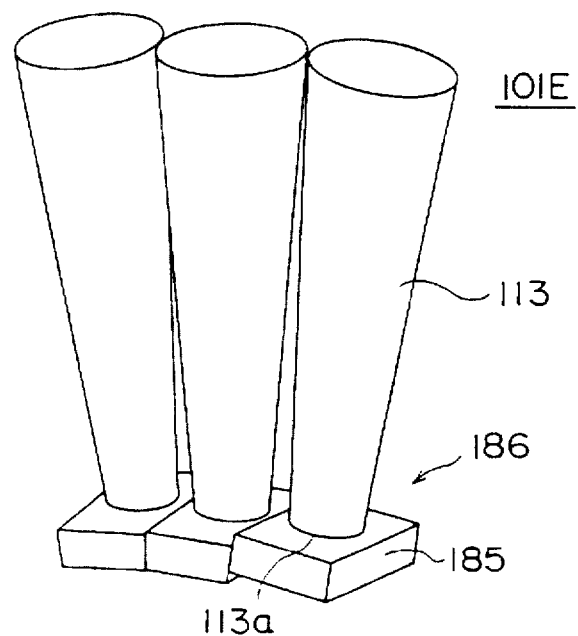
FIG. 14 shows a fifth variation of the image display apparatus main body of FIG. 6.

FIG. 14 is an enlarged fragmentary view of an image display apparatus main body 101E according to a fifth variation. In the image display apparatus main body 101E, a liquid crystal element is used in place of the LED element 180 of the image display apparatus main body 101D. The image display apparatus main body 101E is constructed such that transparent column and liquid crystal element assemblies 186 formed by adhesively attaching a liquid crystal element 185 which does not emit light to the entrance 113a of each of the transparent columns 113.

Since the image display apparatus main body 101E is constructed by arranging the transparent column and liquid crystal element assemblies 186, fabrication thereof is relatively easy.

The arranged liquid crystal elements embody image display means, and the arranged transparent columns embody angle-specific image radial distribution means.

Figure 15:
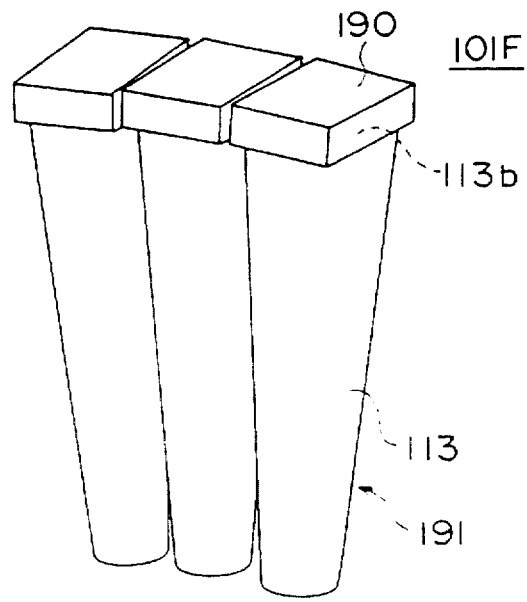
FIG. 15 shows a sixth variation of the image display apparatus main body of FIG. 6.

FIG. 15 is an enlarged fragmentary view of an image display apparatus main body 101F according to a sixth variation. The image display apparatus main body 101F is constructed such that transparent column and liquid crystal element assemblies 191 formed by adhesively attaching a liquid crystal element 190 which does not emit light to the exit surface 113b of each of the transparent columns 113 of FIG. 8 are radially arranged.

Since the image display apparatus main body 101F is constructed by arranging the transparent column and liquid crystal element assemblies 191, fabrication thereof is relatively easy.

The arranged liquid crystal elements 190 embody image display means, and the arranged transparent columns 113 embody angle-specific image radial distribution means.

Figure 16:
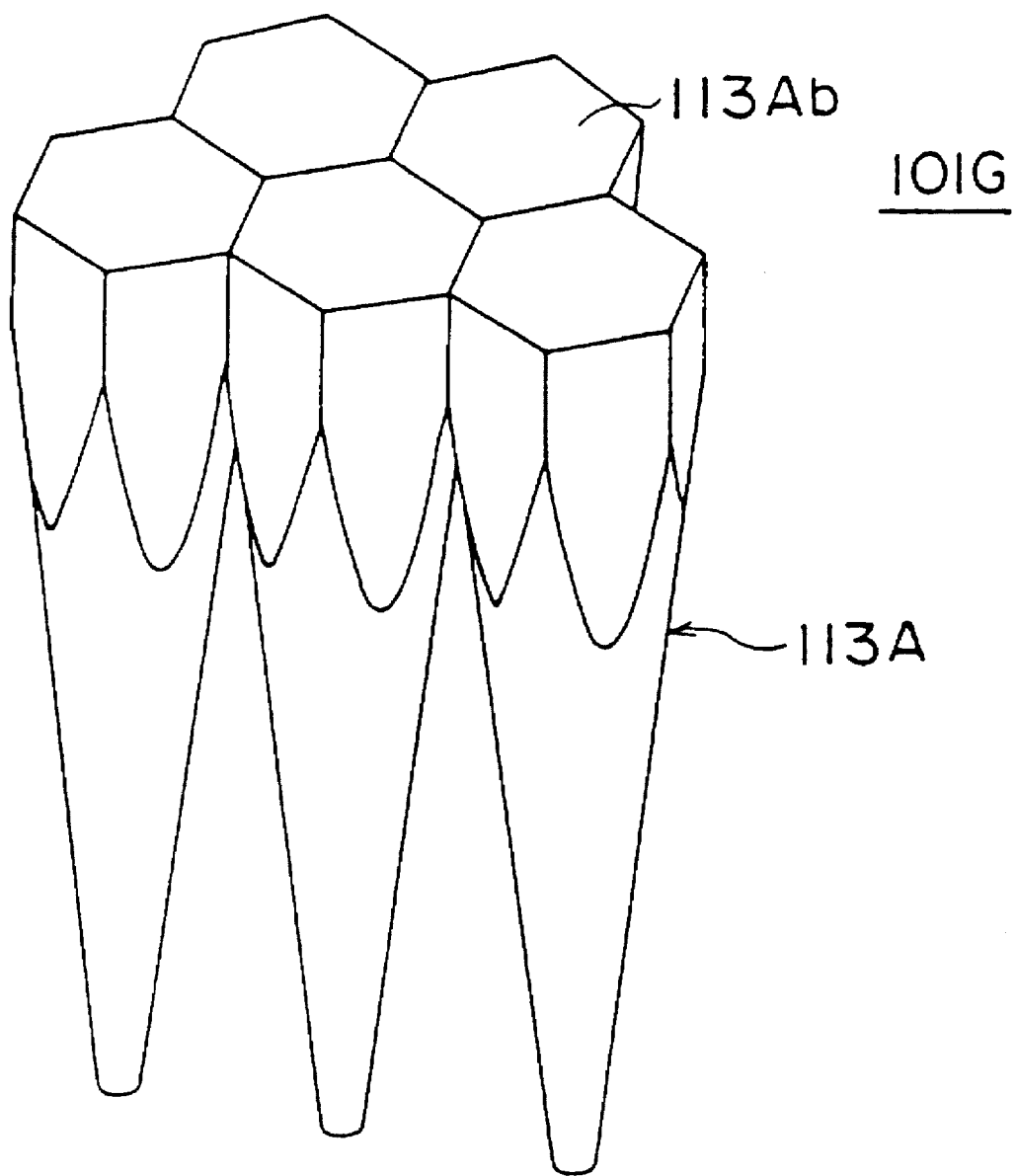
FIG. 16 shows a seventh variation of the image display apparatus main body of FIG. 6.

FIG. 16 is an enlarged fragmentary view of an image display apparatus main body 101G according to a seventh embodiment. The image display apparatus main body 101G is constructed such that transparent columns 113A formed by altering the exit surface 113b of the transparent column 113 to have a hexagonal configuration are provided. The transparent columns 113A are arranged such that no gap exists between the adjacent hexagonal exit surfaces 113Ab. In other words, the transparent columns 113A of the image display apparatus main body 101F can be arranged with precision and ease, utilizing the hexagonal exit surface 113Ab. Therefore, fabrication of the image display apparatus main body 101G is relatively easy.

Figure 17:
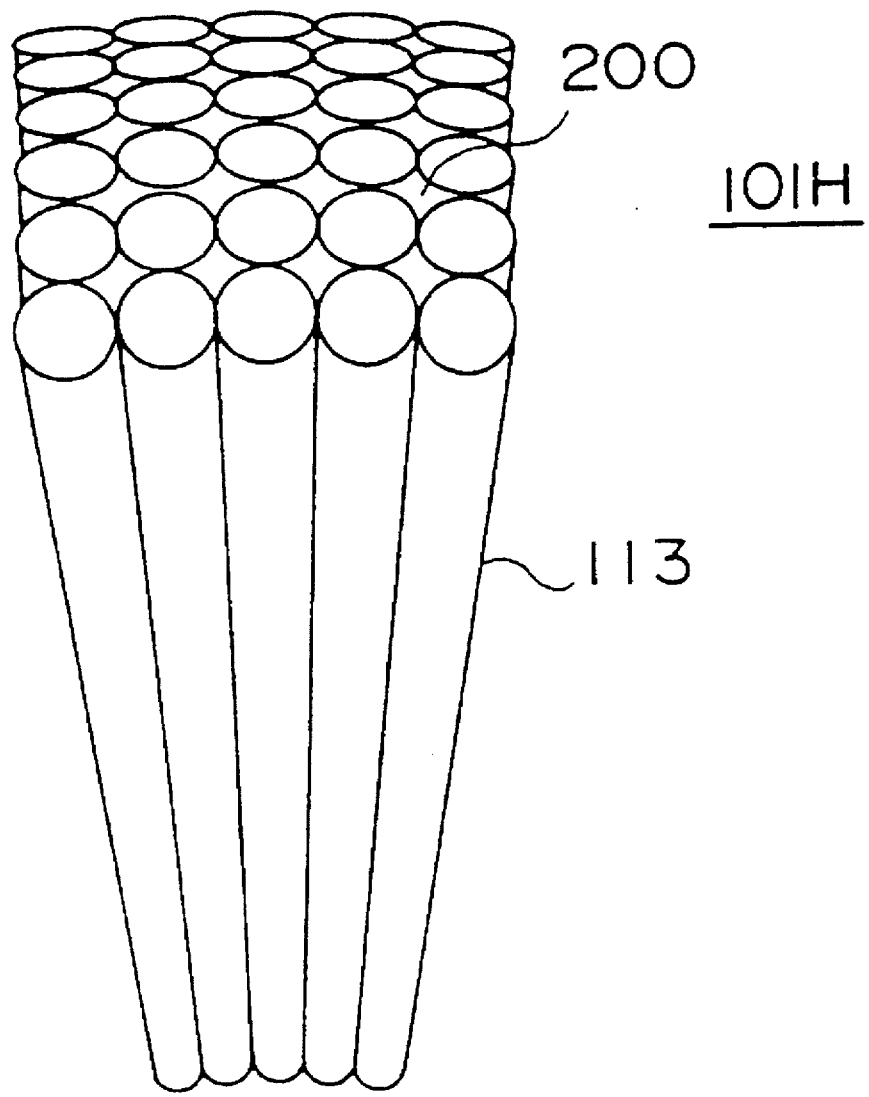
FIG. 17 shows a eighth variation of the image display apparatus main body of FIG. 6.

FIG. 17 is an enlarged fragmentary view of an image display apparatus main body 101H according to an eighth variation. The image display apparatus main body 101H is constructed such that gaps between the adjacent exit surfaces 113b of the transparent columns 113 of FIG. 8 are adhesively filled by a transparent resin 200 (for example, the "Acryl Bond" from Mitsubishi Rayon Incorporated). Since the resin 200 is used as a filling, it is not necessary to arrange the transparent columns 113 with precision, only a rough arrangement being required. Thus, it is comparatively easy to assemble the image display apparatus main body 101H. The resultant surface of the image display apparatus main body 101H is flat.

Figure 18:
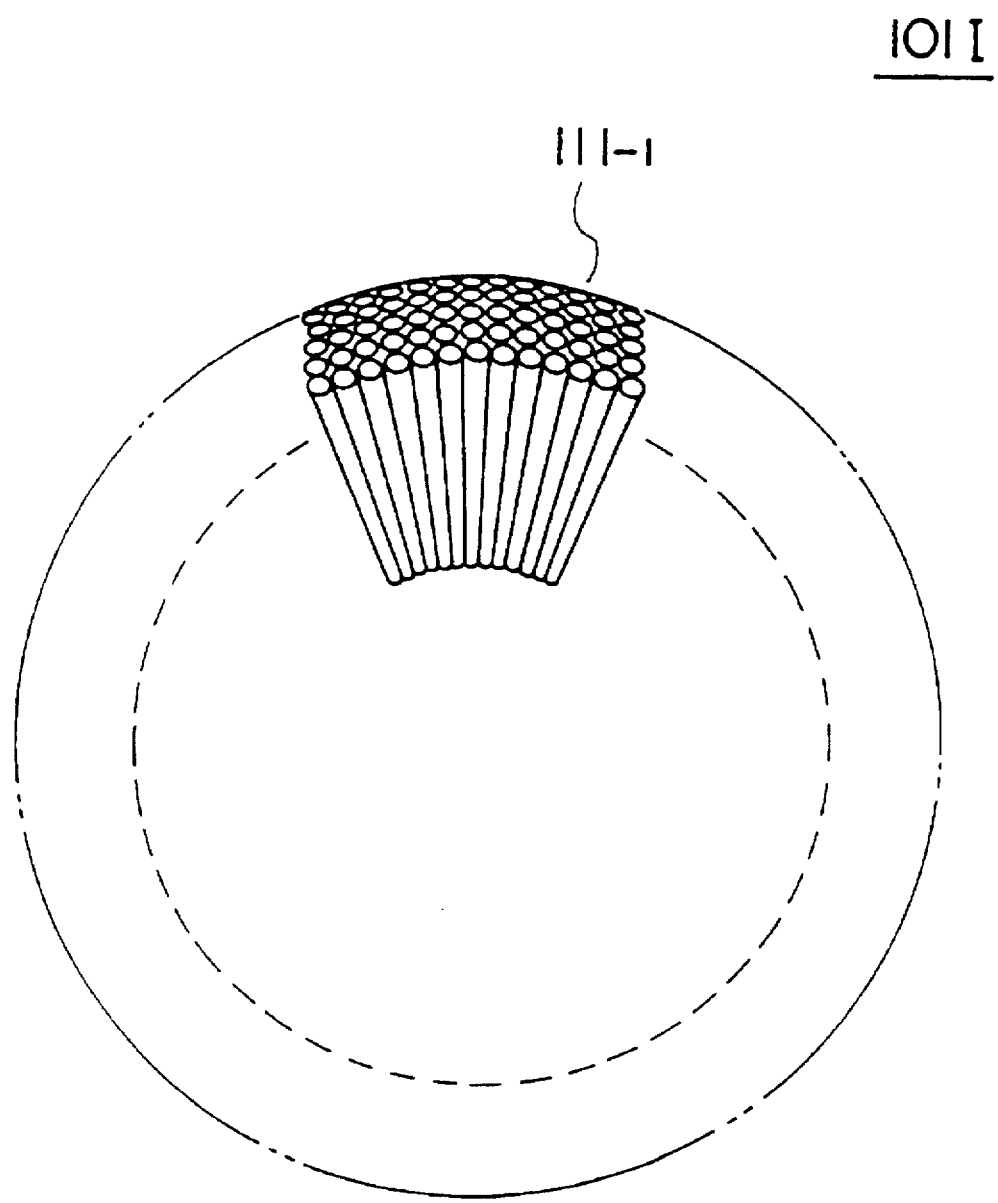
FIG. 18 shows a ninth variation of the image display apparatus main body of FIG. 6.

FIG. 18 shows an image display apparatus main body 101I according to a ninth embodiment. The image display apparatus 101I is constructed such that the angle-specific image radial distribution parts 111-1 are arranged so as to form a spherical surface. According to the image display apparatus main body 101I, it is possible to obtain a special display effect not available according to the image display apparatus main body having a flat surface. The image display apparatus main body 101I also provides a special display effect when used to display two-dimensional images.

A description will now be given of a stereoscopic image display apparatus 100A according to a second embodiment of the present invention.

Figure 19:
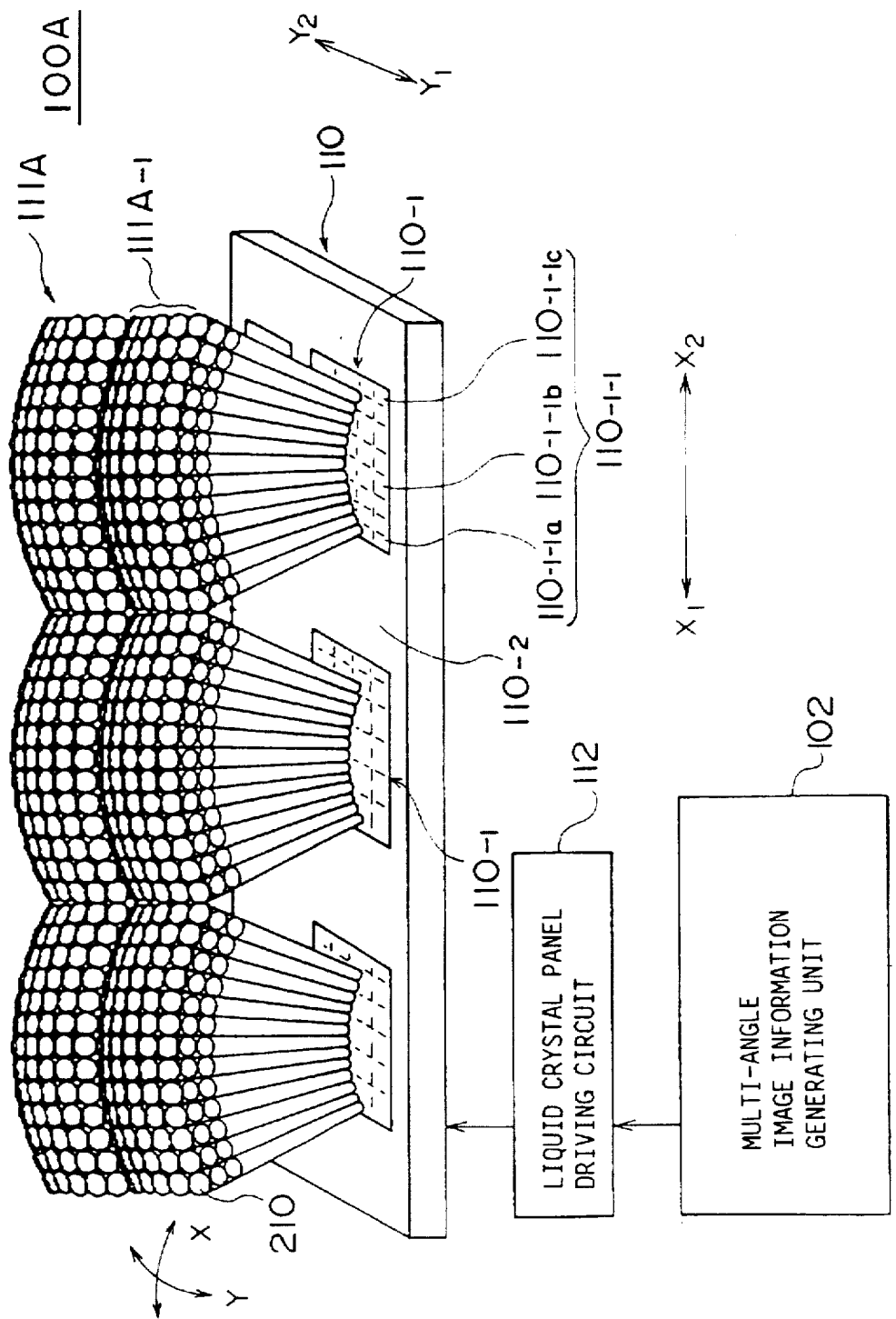
FIG. 19 shows a stereoscopic image display apparatus according to a second embodiment of the present invention.

As shown in FIG. 19, the image display apparatus 100A comprises a flat image display apparatus main body 101J and the multi-angle image information generating unit 102.

The image display apparatus main body 101J has a angle-specific image radial distribution unit 111A instead of the angle-specific image radial distribution unit 111. The angle-specific image radial distribution unit 111A is constructed of a matrix of angle-specific image radial distribution parts 111A-1. The angle-specific image radial distribution part 111A-1 is formed by a plurality of closely arranged transparent columns 113. As indicated by the arcuate arrow X, the array of the transparent columns 113 is formed as a fan spread out in the X1-X2 direction. As indicated by the arcuate arrow Y, the array of the transparent columns 113 is also formed as a fan spread out in the Y1-Y2 direction. An exit surface 210 of the angle-specific image radial distribution part 111A-1 forms a part of a sphere.

Those aspects of the stereoscopic image display apparatus 100A other than the angle-specific image radial distribution unit 111A (the angle-specific image radial distribution part 11A-1) are the same as the corresponding aspects of the stereoscopic image display apparatus 100 of FIG. 6.

In addition to providing an experience of viewing one stereoscopic image turning into another as the viewing point shifts in the X1-X2 direction, the stereoscopic image display apparatus 100A having the above-described construction also provides varying stereoscopic images as the viewing point shifts in the Y1-Y2 direction. Accordingly, the stereoscopic image display apparatus 100A is capable of displaying stereoscopic images having a higher quality than the images provided by the stereoscopic image display apparatus 100.

The image display apparatus main body 101J of the stereoscopic image display apparatus 100A may be any one of the image display apparatus main bodies as described with reference to FIGS. 10A-18.

A description will now be given, with reference to FIG. 20, of a liquid crystal display apparatus 300 according to a third embodiment of the present invention.

Figure 20:
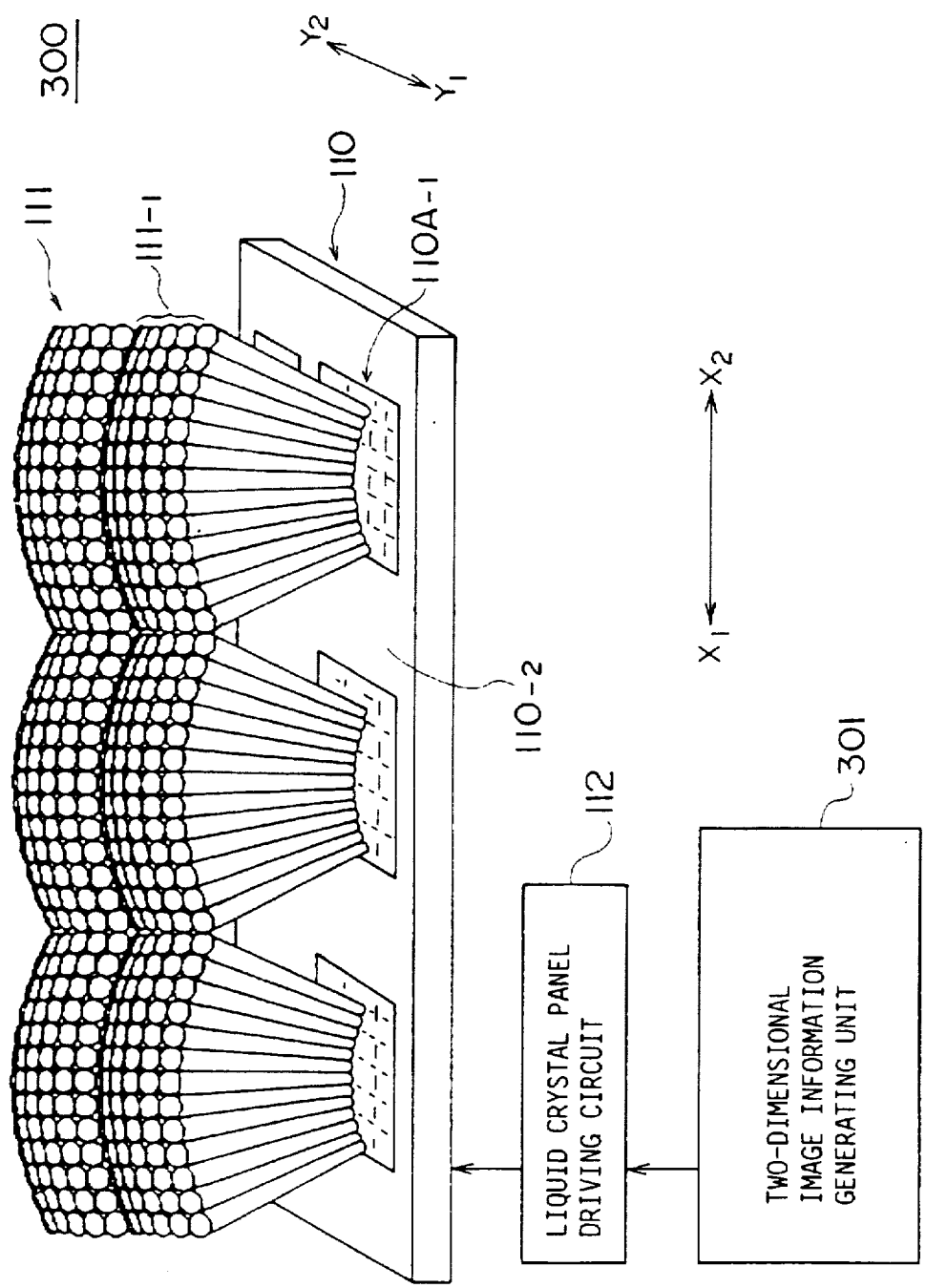
FIG. 20 shows a liquid crystal display apparatus according to a third embodiment of the present invention.

As shown in FIG. 20, the liquid crystal display apparatus 300 is constructed such that a two-dimensional image information generating unit 301 is provided instead of the multi-angle image information generating unit 102 of the stereoscopic image display apparatus of FIG. 6.

The liquid crystal panel 110 of the liquid crystal display apparatus 300 is constructed of a matrix of a plurality of rectangular two-dimensional image display areas 110A-1.

An image displayed in the two-dimensional image display area 110A-1 is caused to spread out in the X1-X2 direction by the angle-specific image radial distribution part 111-1 of the angle-specific image radial distribution part 111.

Accordingly, the liquid crystal display apparatus 300 provides a comparatively larger field of view in the X1-X2 direction.

A description will now be given, with reference to FIG. 21, of a liquid crystal display apparatus 300A according to a fourth embodiment of the present invention.

Figure 21:
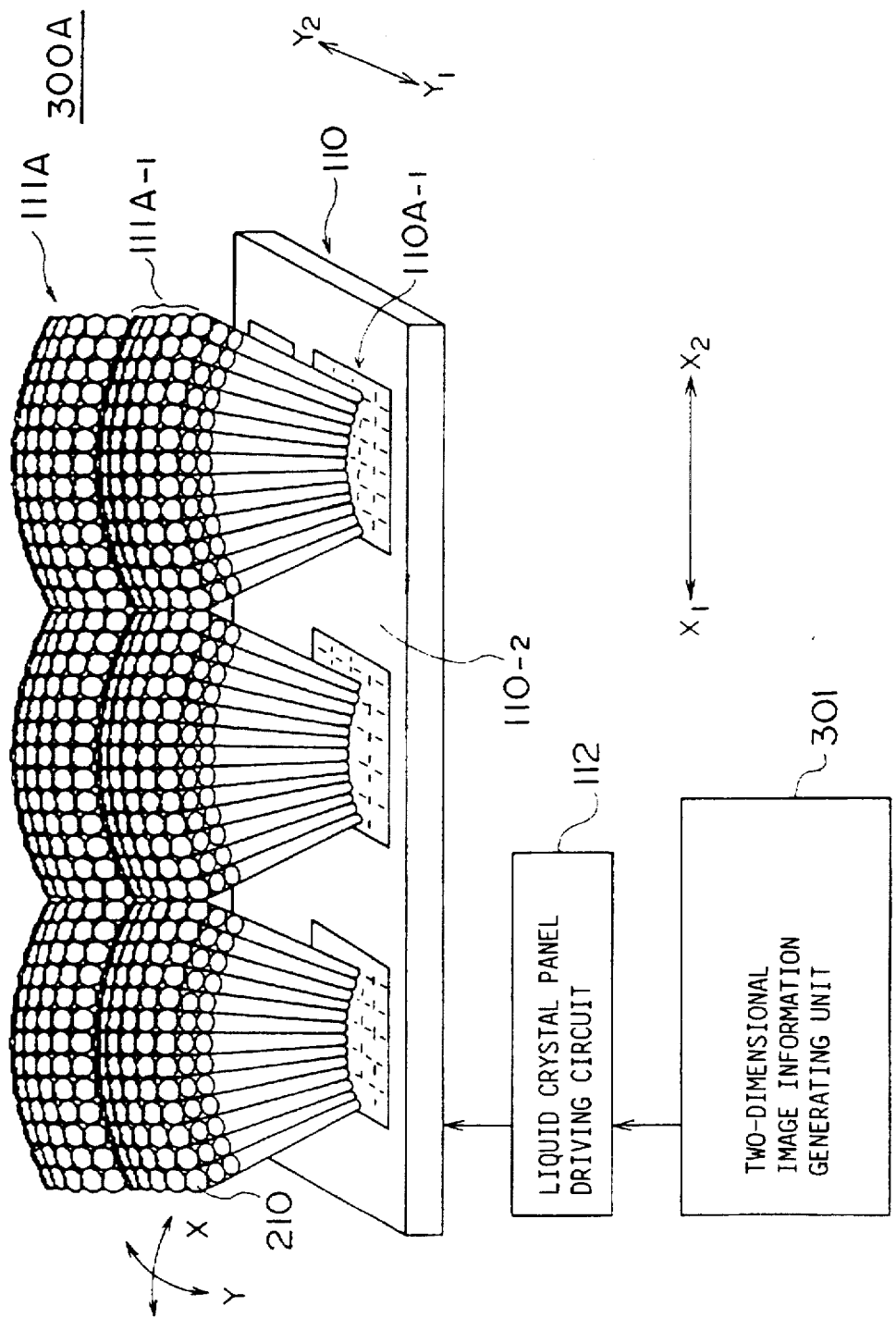
FIG. 21 shows a liquid crystal display apparatus according to a fourth embodiment of the present invention.

As shown in FIG. 21, the liquid crystal display apparatus 300A is provided with a two-dimensional image information generating unit 301 instead of the multi-angle image information generating unit 102 of the stereoscopic image display apparatus 100A.

The liquid crystal panel 110 is constructed of a matrix of a plurality of rectangular two-dimensional image display areas 110A-1.

An image displayed in the two-dimensional image display area 110A-1 is caused to spread out in the Y1-Y2 direction as well as in the X1-X2 direction by the angle-specific image radial distribution part 111A-1 of the angle-specific image radial distribution unit 111A.

Accordingly, the liquid crystal display apparatus 300 provides a comparatively large field of view both in the X1-X2 direction and in the Y1-Y2 direction.

The present invention is not limited to the above described embodiments, and variations and modifications may be made without departing from the scope of the present invention.

What is claimed is:

1. A stereoscopic image display apparatus comprising:
    multi-angle image information generating means for generating angle-specific image information for a plurality of viewing angles from which an object is viewed;
    image display means for displaying an angle-specific image derived from said angle-specific image information supplied by said multi-angle image information generating means; and
    angle-specific image radial distribution means including transparent blocks arranged in a matrix formation and provided at a front of said image display means, which radially distributes an angle specific image by providing directivity to a light beam carrying an angle-specific image displayed on said image display means and directing the angle-specific image to a corresponding angle.

2. The stereoscopic image display apparatus as claimed in claim 1, wherein said angle-specific image radial distribution means radially distributes the angle-specific image in a longitudinal direction and in a latitudinal direction defined when a viewer faces a front of the stereoscopic image display apparatus.

3. The stereoscopic image display apparatus as claimed in claim 1, wherein said angle-specific image radial distribution means has a spherical configuration.

4. The stereoscopic image display apparatus as claimed in claim 1, including a matrix of image display blocks each formed of a rectangular liquid crystal panel having an angle-specific image groupwise display area and of an angle-specific image radial distribution part fixed on said liquid crystal panel, an array of said liquid crystal panels constituting said image display means, and an array of said angle-specific image radial distribution parts constituting said angle-specific image radial distribution means.

5. A stereoscopic image display apparatus comprising:
   a flat image display apparatus main body;
   multi-angle image information generating means for generating angle-specific image information for a plurality of viewing angles from which an object is viewed,
   wherein said image display apparatus main body comprises:
      image display means for displaying an angle-specific image derived from said angle-specific image information supplied by said multi-angle image information generating means; and
      angle-specific image radial distribution means including transparent blocks arranged in a matrix formation and provided at the front of said image display means, which radially distributes an angle-specific image by providing directivity to a light beam carrying angle-specific image displayed on said image display means and directing the angle-specific image to a corresponding angle.

6. The stereoscopic image display apparatus as claimed in claim 5, wherein said angle-specific image radial distribution means radially distributes the angle-specific image in a longitudinal direction and in a latitudinal direction defined when a viewer faces a front of the stereoscopic image display apparatus.

7. The stereoscopic image display apparatus as claimed in claim 5, wherein said angle-specific image radial distribution means has a spherical configuration.

8. The stereoscopic image display apparatus as claimed in claim 5, including a matrix of image display blocks each formed of a rectangular liquid crystal panel having an angle-specific image groupwise display area and of an angle-specific image radial distribution part fixed on said liquid crystal panel, an array of said liquid crystal panels constituting said image display means, and an array of said angle-specific image radial distribution parts constituting said angle-specific image radial distribution means.

9. The stereoscopic image display apparatus as claimed in claim 5, including an array of radially arranged assemblies each formed of a transparent column and a light-emitting element adhesively attached to an entrance surface of said transparent column, an array of said light-emitting elements constituting said image display means, and an array of said transparent columns constituting angle-specific image radial distribution means.

10. The stereoscopic image display apparatus as claimed in claim 5, wherein said multi-angle image information generating means comprises a three-dimensional image information generating unit for generating three-dimensional image information and a plurality of angle-specific image information generating parts each of which extracts and processes a portion of the three-dimensional image information generated by the three-dimensional image information generating unit so as to generate two-dimensional image information providing an image viewed from a predetermined angle, said plurality of angle-specific image information generating parts being operated simultaneously so as to perform parallel processing of said three-dimensional image information.

11. The stereoscopic image display apparatus as claimed in claim 12, wherein each of said plurality of transparent columns has an entrance surface and an exit surface, the exit surface being larger in area than the entrance surface.

12. A stereoscopic image display apparatus comprising:
   multi-angle image information generating means for generating angle-specific image information for a plurality of viewing angles from which an object is viewed;
   image display means for displaying an angle-specific image derived from said angle-specific image information supplied by said multi-angle image information generating means; and
   angle-specific image radial distribution means provided at a front of said image display means, which radially distributes an angle specific image by providing directivity to a light beam carrying an angle-specific image displayed on said image display means and directing the angle-specific image to a corresponding angle;
   wherein said angle-specific image radial distribution means is an array of a plurality of transparent columns, the array being formed in a fan shape.

13. The stereoscopic image display apparatus as claimed in claim 12, wherein each of said plurality of transparent columns has its exit surface formed as a regular polygon and is in close contact with adjacent exit surfaces so that said plurality of transparent columns are closely packed.

14. The stereoscopic image display apparatus as claimed in claim 13, wherein said image display means is a liquid crystal panel and said angle-specific image individual input means is implemented by a directional light source provided beneath said liquid crystal panel and having a forward directivity.

15. The stereoscopic image display apparatus as claimed in claim 12, wherein each of said plurality of transparent columns is substantially conical and a transparent resin is used to adhesively fill gaps between adjacent exit surfaces of said plurality of transparent columns in the array.

16. A stereoscopic image display apparatus comprising:
   multi-angle image information generating means for generating angle-specific image information for a plurality of viewing angles from which an object is viewed;
   image display means for displaying an angle-specific image derived from said angle-specific image information supplied by said multi-angle image information generating means; and
   angle-specific image radial distribution means provided at a front of said image display means, which radially distributes an angle specific image by providing directivity to a light beam carrying an angle-specific image displayed on said image display means and directing the angle-specific image to a corresponding angle;
   wherein said angle-specific image radial distribution means includes an array of a plurality of transparent columns, the array being formed in a fan shape, and
   said stereoscopic image display apparatus further comprises angle-specific image individual input means for inputting the angle-specific image to a corresponding one of said plurality of transparent columns constituting said angle-specific image radial distribution means.

17. The stereoscopic image display apparatus as claimed in claim 16, wherein said angle-specific image individual input means is implemented by an assembly of optical guide members each provided in a corresponding one of said plurality of transparent columns constituting said angle-specific image radial distribution means, such that said assembly is located between said image display means and said angle-specific image radial distribution means.

18. A stereoscopic image display apparatus comprising:
multi-angle image information generating means for generating angle-specific image information for a plurality of viewing angles from which an object is viewed;
image display means for displaying an angle-specific image derived from said angle-specific image information supplied by said multi-angle image information generating means;
angle-specific image radial distribution means provided at a front of said image display means, which radially distributes an angle specific image by providing directivity to a light beam carrying an angle-specific image displayed on said image display means and directing the angle-specific image to a corresponding angle;
an array of radially arranged assemblies each formed of a transparent column and a light-emitting element adhesively attached to an entrance surface of said transparent column;
an array of said light-emitting elements constituting said image display means; and
an array of said transparent columns constituting angle specific image radial distribution means.

19. A stereoscopic image display apparatus comprising:
multi-angle image information generating means for generating angle-specific image information for a plurality of viewing angles from which an object is viewed;
image display means for displaying an angle-specific image derived from said angle-specific image information supplied by said multi-angle image information generating means;
angle-specific image radial distribution means provided at a front of said image display means, which radially distributes an angle specific image by providing directivity to a light beam carrying an angle-specific image displayed on said image display means and directing the angle-specific image to a corresponding angle;
an array of radially arranged assemblies each formed of a transparent column and a non-light-emitting element adhesively attached to an entrance surface of said transparent column;
an array of said non-light-emitting elements constituting said image display means; and
an array of said transparent columns constituting angle-specific image radial distribution means.

20. A stereoscopic image display apparatus comprising:
multi-angle image information generating means for generating angle-specific image information for a plurality of viewing angles from which an object is viewed;
image display means for displaying an angle-specific image derived from said angle-specific image information supplied by said multi-angle image information generating means;
angle-specific image radial distribution means provided at a front of said image display means, which radially distributes an angle specific image by providing directivity to a light beam carrying an angle-specific image displayed on said image display means and directing the angle-specific image to a corresponding angle;
an array of radially arranged assemblies each formed of a transparent column and a non-light-emitting element adhesively attached to an exit surface of said transparent column;
an array of said non-light-emitting elements constituting said image display means; and
an array of said transparent columns constituting angle-specific image radial distribution means.

21. A stereoscopic image display apparatus comprising:
a flat image display apparatus main body;
multi-image information generating means for generating angle-specific image information for a plurality of viewing angles from with an object is viewed, wherein said image display apparatus main body comprises:
image display means for displaying an angle-specific image derived from said angle-specific image information supplied by said multi-angle image information generating means; and
angle-specific image radial distribution means provided at the front of said image display means, which radially distributes an angle-specific image by providing directivity to a light beam carrying angle-specific image displayed on said image display means and directing the angle-specific image to a corresponding angle;
said angle-specific image radial distribution means including an array of a plurality of transparent columns, the array being formed in a fan shape.

22. The stereoscopic image display apparatus as claimed in claim 21, wherein each of said plurality of transparent columns is substantially conical and a transparent resin is used to adhesively fill gaps between adjacent exit surfaces of said plurality of transparent columns in the array.

23. The stereoscopic image display apparatus as claimed in claim 21, wherein each of said plurality of transparent columns has an exit surface formed as a regular polygon and is in close contact with adjacent exit surfaces so that said plurality of transparent columns are closely packed.

24. The stereoscopic image display apparatus as claimed in claim 23, wherein said image display means is a liquid crystal panel and said angle-specific image individual input means is implemented by a directional light source provided beneath said liquid crystal panel and having a forward directivity.

25. A stereoscopic image display apparatus comprising:
a flat image display apparatus main body;
multi-image information generating means for generating angle-specific image information for a plurality of viewing angles from with an object is viewed, wherein said image display apparatus main body comprises:
image display means for displaying an angle-specific image derived from said angle-specific image information supplied by said multi-angle image information generating means; and
angle-specific image radial distribution means provided at the front of said image display means, which radially distributes an angle-specific image by providing directivity to a light beam carrying angle-specific image displayed on said image display means and directing the angle-specific image to a corresponding angle;
said angle-specific image radial distribution means further including an array of a plurality of transparent columns, the array being formed in a fan shape; and
said image display apparatus main body includes angle-specific image individual input means for inputting the angle-specific image to a corresponding one of said plurality of transparent columns.

26. The stereoscopic image display apparatus as claimed in claim 25, wherein said angle-specific image individual input means is implemented by an assembly of optical guide members each provided in a corresponding one of said plurality of transparent columns constituting said angle-specific image radial distribution means, such that said assembly is located between said image display means and said angle-specific image radial distribution means.

27. A stereoscopic image display apparatus comprising:

a flat image display apparatus main body;

multi-image information generating means for generating angle-specific image information for a plurality of viewing angles from with an object is viewed, wherein said image display apparatus main body comprises:

image display means for displaying an angle-specific image derived from said angle-specific image information supplied by said multi-angle image information generating means;

angle-specific image radial distribution means provided at the front of said image display means, which radially distributes an angle-specific image by providing directivity to a light beam carrying angle-specific image displayed on said image display means and directing the angle-specific image to a corresponding angle;

an array of radially arranged assemblies each formed of a transparent column and a non-light-emitting element adhesively attached to an exit surface of said transparent column;

an array of said non-light-emitting elements constituting said image display means; and an array of said transparent columns constituting angle-specific image radial distribution means.

28. A stereoscopic image display apparatus comprising:

multi-angle image information generating means for generating angle-specific image information for a plurality of viewing angles from which an object is viewed;

image display means for displaying an angle-specific image derived from said angle-specific image information supplied by said multi-angle image information generating means; and angle-specific image radial distribution means provided at a front of said image display means, which radially distributes an angle specific image by providing directivity to a light beam carrying an angle-specific image displayed on said image display means and directing the angle-specific image to a corresponding angle;

wherein angle-specific images respectively corresponding to the plurality of viewing angles are simultaneously displayed on said image display means.

29. A stereoscopic image display apparatus comprising:

a flat image display apparatus main body;

multi-angle image information generating means for generating angle-specific image information for a plurality of viewing angles from which an object is viewed, wherein said image display apparatus main body comprises:

image display means for displaying an angle-specific image derived from said angle-specific image information supplied by said multi-angle image information generating means; and angle-specific image radial distribution means provided at the front of said image display means, which radially distributes an angle-specific image by providing directivity to a light beam carrying angle-specific image displayed on said image display means and directing the angle-specific image to a corresponding angle;

wherein angle-specific images respectively corresponding to the plurality of viewing angles are simultaneously displayed on said image display means.

* * * * *